(12) United States Patent
Sharifi et al.

(10) Patent No.: US 11,514,109 B2
(45) Date of Patent: Nov. 29, 2022

(54) INFERRING SEMANTIC LABEL(S) FOR ASSISTANT DEVICE(S) BASED ON DEVICE-SPECIFIC SIGNAL(S)

(71) Applicant: Google LLC, Mountain View, CA (US)

(72) Inventors: Matthew Sharifi, Kilchberg (CH); Victor Carbune, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 105 days.

(21) Appl. No.: 17/083,613

(22) Filed: Oct. 29, 2020

(65) Prior Publication Data

US 2022/0139573 A1 May 5, 2022

(51) Int. Cl.
*G06F 15/16* (2006.01)
*G06F 16/9032* (2019.01)
*G16Y 10/80* (2020.01)
*G16Y 40/35* (2020.01)
*G10L 15/30* (2013.01)

(52) U.S. Cl.
CPC ........ *G06F 16/90332* (2019.01); *G10L 15/30* (2013.01); *G16Y 10/80* (2020.01); *G16Y 40/35* (2020.01)

(58) Field of Classification Search
None
See application file for complete search history.

(56) References Cited

U.S. PATENT DOCUMENTS

| | | | | |
|---|---|---|---|---|
| 9,781,575 | B1 * | 10/2017 | Wan | H04W 4/023 |
| 10,410,090 | B1 * | 9/2019 | Wilczynski | G06K 9/6257 |
| 10,904,027 | B1 * | 1/2021 | Basak | H04L 12/2816 |
| 11,010,982 | B1 * | 5/2021 | Guerra Filho | G06T 19/20 |
| 11,210,851 | B1 * | 12/2021 | Nussbaum | H04W 4/021 |
| 2015/0052231 | A1 | 2/2015 | Sun et al. | |
| 2016/0019458 | A1 * | 1/2016 | Kaufhold | G01S 13/9027 706/20 |
| 2018/0096683 | A1 | 4/2018 | James et al. | |
| 2018/0234294 | A1 * | 8/2018 | Wadekar | H04L 12/4625 |
| 2021/0263900 | A1 * | 8/2021 | Joyce | G06N 20/00 |

OTHER PUBLICATIONS

European Patent Office; International Search Report and Written Opinion of PCT/US2020/064824; 13 pages; dated Jun. 24, 2021.

* cited by examiner

*Primary Examiner* — Phuoc H Nguyen

(74) *Attorney, Agent, or Firm* — Middleton Reutlinger

(57) ABSTRACT

Implementations can identify a given assistant device from among a plurality of assistant devices in an ecosystem, obtain device-specific signal(s) that are generated by the given assistant device, process the device-specific signal(s) to generate candidate semantic label(s) for the given assistant device, select a given semantic label for the given semantic device from among the candidate semantic label(s), and assigning, in a device topology representation of the ecosystem, the given semantic label to the given assistant device. Implementations can optionally receive a spoken utterance that includes a query or command at the assistant device(s), determine a semantic property of the query or command matches the given semantic label to the given assistant device, and cause the given assistant device to satisfy the query or command.

20 Claims, 6 Drawing Sheets

INFERRING SEMANTIC LABEL(S) FOR ASSISTANT DEVICE(S) BASED ON DEVICE-SPECIFIC SIGNAL(S)

BACKGROUND

Humans can engage in human-to-computer dialogs with interactive software applications referred to herein as "automated assistants" (also referred to as "chat bots," "interactive personal assistants," "intelligent personal assistants," "personal voice assistants," "conversational agents," etc.). For example, a human (which when interacting with an automated assistant may be referred to as a "user") may provide an input (e.g., commands, queries, and/or requests) to the automated assistant that can cause the automated assistant to generate and provide responsive output, to control one or more Internet of things (IoT) devices, and/or to perform one or more other functionalities. The input provided by the user can be, for example, spoken natural language input (i.e., spoken utterances) which may in some cases be converted into text (or other semantic representation) and then further processed, and/or typed natural language input.

In some cases, automated assistants may include automated assistant clients that are executed locally by assistant devices and that are engaged directly by users, as well as cloud-based counterpart(s) that leverage the virtually limitless resources of the cloud to help automated assistant clients respond to users' inputs. For example, an automated assistant client can provide, to the cloud-based counterpart(s), an audio recording of a spoken utterance of a user (or a text conversion thereof), and optionally data indicative of the user's identity (e.g., credentials). The cloud-based counterpart may perform various processing on the query to return result(s) to the automated assistant client, which may then provide corresponding output to the user.

Many users may engage automated assistants using multiple assistant devices. For example, some users may possess a coordinated "ecosystem" of assistant devices that can receive user input directed to the automated assistant and/or can be controlled by the automated assistant, such as one or more smart phones, one or more tablet computers, one or more vehicle computing systems, one or more wearable computing devices, one or more smart televisions, one or more interactive standalone speakers, and/or one or more IoT devices, among other assistant devices. A user may engage in human-to-computer dialog with an automated assistant using any of these assistant devices (assuming an automated assistant client is installed and the assistant device is capable of receiving input). In some cases these assistant devices may be scattered around the user's primary residence, secondary residence, workplace, and/or other structure. For example, mobile assistant devices such as smart phones, tablets, smart watches, etc., may be on the user's person and/or wherever the user last placed them. Other assistant devices, such as traditional desktop computers, smart televisions, interactive standalone speakers, and IoT devices may be more stationary but nonetheless may be located at various places (e.g., rooms) within the user's home or workplace.

Techniques exist to enable user(s) (e.g., a single user, multiple users in a family, co-workers, co-inhabitants, etc.) to manually assign labels to assistant devices in an ecosystem of assistant devices, and to subsequently utilize an automated assistant client of any one of the assistant devices to interact with or control any one of the assistant devices. For example, a user can issue a spoken command of "show me some recipes for chili on the kitchen device" to an automated assistant client of an assistant device to cause the assistant device (or another assistant device in the ecosystem) to retrieve search results for chili recipes and present the search results to the user via the kitchen device. However, such techniques require that a user specify a particular assistant device by a previously assigned label (e.g., "the kitchen device") that the user(s) may have forgotten, or require the automated assistant to guess a "best" device to provide the search results (e.g., a device closest to the user). Further, if the particular assistant device is newly introduced to the ecosystem or moved within the ecosystem, the label assigned to the particular assistant device by the user(s) may not be representative of the particular assistant device.

SUMMARY

Implementations described herein relate to assigning semantic labels to respective assistant devices in a device topology representation of an ecosystem that includes a plurality of assistant devices. The semantic labels that are assigned to the respective assistant devices can be inferred based on one or more device-specific signals that are associated with the respective assistant devices. The one or more device-specific signals can include, for example, one or more queries previously received at the respective assistant devices (if any), one or more commands previously executed at the respective assistant devices (if any), instances of ambient noise previously detected at the respective assistant devices (and optionally only when speech reception was active at the respective assistant devices), unique identifier(s) (or label(s)) for any other assistant device(s) that are locationally proximate to the respective assistant devices, and/or user preferences of a user associated with the ecosystem that are determined based on user interactions with the plurality of assistant devices in the ecosystem. Each of the one or more device-specific signals associated with the respective assistant devices can be processed to classify each of them into one or more semantic categories from among a plurality of disparate semantic categories. One or more candidate semantic labels can be generated for the respective assistant devices based on the semantic categories into which one or more of the device-specific signals are classified. Further, a given semantic label, from among the one or more candidate semantic labels, and for a given one of the respective assistant devices, can be selected and assigned to the given one of the respective assistant devices in the device topology representation of the ecosystem.

For example, assume a given assistant device is an interactive standalone speaker device having a display that is located in a primary dwelling of a user that is associated with the ecosystem. Further assume that a plurality of queries related to retrieving food recipes have been received and executed at the given assistant device and/or that a plurality of commands related to setting timers have been received and executed at the given assistant device, assume that instances of ambient noise have been detected at the client device, assume that a unique identifier (or label) associated with an additional assistant device in the ecosystem corresponding to "smart oven" is detected at the given assistant device, and assume user preferences of the user associated with the ecosystem indicate the user likes a fictitious chef named Johnny Flay. In this example, further assume that the queries related to retrieving food recipes are classified into a "recipes", "kitchen", and/or "cooking" category and that the commands related to setting timers are classified into a "timing" and/or "cooking" category, further assume that the instances of ambient noise are classified into a "kitchen" and/or "cooking" category based on the ambient noise capturing cooking sounds (e.g., food in a skillet sizzling, a knife chopping food, a microwave in use, etc.), further assume that the unique identifier (or label) of "smart oven" that is associated with the additional assistant device is classified into a "kitchen" and/or "cooking" category, and further assume that the fictitious chef is classified into a "cooking" category (or a more particular category of "Johnny Flay"). As a result, candidate semantic labels of "recipes display device", "kitchen display device", "cooking display device", "timing display device", and "Johnny Flay device" can be generated for the interactive standalone speaker device having the display. Further, a given semantic label, from among the candidate semantic labels, can be assigned to the interactive standalone speaker device having the display in the device topology representation of the ecosystem for the primary dwelling of the user.

In some implementations, the given semantic label can be automatically assigned to the given assistant device in the device topology representation of the ecosystem. For example, if a confidence level associated with the given semantic label satisfies a threshold confidence level, then the given semantic label may be automatically assigned to the given assistant device in the device topology representation of the ecosystem. The confidence level associated with the given semantic label can be determined while processing the one or more device-specific signals that are associated with the given assistant device. For example, the confidence level associated with the given assistant device can be based on a quantity of the one or more device-specific signals that are classified into one or more of the semantic categories. For instance, if nine queries related to retrieving food recipes have been received at the given assistant device and only one query related to retrieving weather information has been received at the given assistant device, then the semantic label "cooking display device" or "recipe display device" can be automatically assigned to given assistant device in the device topology representation of the ecosystem (even if the given assistant device is not located in a kitchen of the user). For example, the confidence level associated with the given assistant device can be based on measure(s) that are determined based on output generated using semantic classifier(s) and/or ambient noise detection model(s) to process the one or more device-specific signals. For instance, the queries or commands (or text corresponding thereto) that are previously received can be processed, using semantic classifier(s), to classify each of the queries or commands into one or more of the semantic categories, the instances of the ambient noise can be processed, using ambient noise detection model(s), to classify each of the instances of the ambient noise one or more of the semantic categories, and the unique identifier(s) (or label(s)) can be processed, using semantic classifier(s), to classify each of the unique identifier(s) (or label(s)) into one or more of the semantic categories along with respective measures. As another example, if the given semantic label is unique (relative to the other assistant devices that are locationally proximate to the given assistant device in the ecosystem), then the given semantic label may be automatically assigned to the given assistant device in the device topology representation of the ecosystem.

In some additional or alternative implementations, the given semantic label can be assigned to the given assistant device in the device topology representation of the ecosystem in response to receiving user input to assign the given semantic label to the given assistant device. For example, a prompt can be generated to solicit a selection, from a user that is associated with the ecosystem, of the given semantic label from among one or more of the candidate semantic labels. The prompt can be rendered at a client device of the user (e.g., the given assistant device or another client device of the user (e.g., a mobile phone)), and the given semantic label can be assigned to the given assistant device in response to receiving the selection of the given semantic label. For instance, assume the one or more candidate semantic labels include "cooking display device", "recipe display device", and "weather display device". In this instance, the prompt can include each of the candidate semantic labels and request that the user select the given semantic label, from among these candidate semantic labels, that should be assigned to the given assistant device (and optionally replace an existing semantic label). Although the above examples are described with respect to a single semantic label being assigned to the given assistant device, it should be understood that is for the sake of example and is not meant to be limiting. For example, the assistant devices described herein can be assigned multiple semantic labels, such that each of the assistant devices are stored in association with a list of semantic labels.

In various implementations, and subsequent to the one or more of the semantic labels being assigned to the respective assistant devices in the device topology representation of the ecosystem, the semantic labels that are assigned to the assistant devices according to the techniques described herein can also be utilized in processing spoken utterances received at one or more of the assistant devices in the ecosystem. For example, audio data corresponding to the spoken utterance can be processed to identify a semantic property that is included in the spoken utterance. Further, an embedding (e.g., a word2vec representation) of the identified semantic property can be generated and compared to a plurality of embeddings of respective semantic labels that are assigned to the assistant devices in the ecosystem (e.g., respective word2vec representations). Further, it may be determined that the semantic property matches a given embedding, of the plurality of embeddings of the respective semantic labels, based on the comparison. For example, assume the embeddings are word2vec representations. In this example, a cosine distance between the word2vec representation of the semantic property and each of the word2vec representations of the respective semantic labels can be determined, and a given semantic label that is associated with a respective cosine distance that satisfies a distance threshold can be utilized to determine the semantic property of the spoken utterance matches the given semantic label that is (e.g., an exact match or soft match). As a result, a given assistant device that is associated with the given semantic label may be selected to satisfy the spoken utterance. Additionally or alternatively, proximity of the user to the given assistant device and/or device capabilities of the given assistant device can be considered in selecting the given assistant device to satisfy the spoken utterance.

By using the techniques described herein to infer and assign semantic labels to the assistant devices in the ecosystem, the device topology representation of the ecosystem can be maintained up-to-date without requiring multiple (or even any) user interface inputs to do so. Further, the semantic labels that are assigned to the assistant devices are semantically meaningful for the user in that the semantic labels assigned to the respective assistant devices are selected based on the usage of the respective assistant devices and/or respective portions of the ecosystem in which the respective assistant devices are located. Accordingly, when spoken utterances are received at one or more of the assistant devices in the ecosystem, an automated assistant can more robustly and/or accurately select one or more of the assistant devices that are best suited for satisfying the spoken utterance. As a result, a quantity and/or duration of user inputs that are received by the one or more of the assistant devices in the ecosystem can be reduced because the user associated with the ecosystem need not specify particular devices to satisfy the spoken utterance or repeat the spoken utterance if an incorrect device is selected to satisfy the spoken utterance, thereby conserving computational resources at the assistant devices and/or network resources by reducing network traffic. Further, the quantity of user inputs that are received by the one or more of the assistant devices in the ecosystem can be reduced because the user need not manually update the device topology representation via a software application associated with the ecosystem when an assistant device is newly added to the ecosystem, moved locations within the ecosystem, or located within a portion of the ecosystem that has been repurposed (e.g., a room in a primary dwelling of the user has been changed from a den to a bedroom).

The above description is provided as an overview of only some implementations of the present disclosure. Further description of those implementations, and other implementations, are described in more detail herein. As one non-limiting example, various implementations are described in more detail in the claims included herein.

In addition, some implementations include one or more processors of one or more computing devices, where the one or more processors are operable to execute instructions stored in associated memory, and where the instructions are configured to cause performance of any of the methods described herein. Some implementations also include one or more non-transitory computer readable storage media storing computer instructions executable by one or more processors to perform any of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
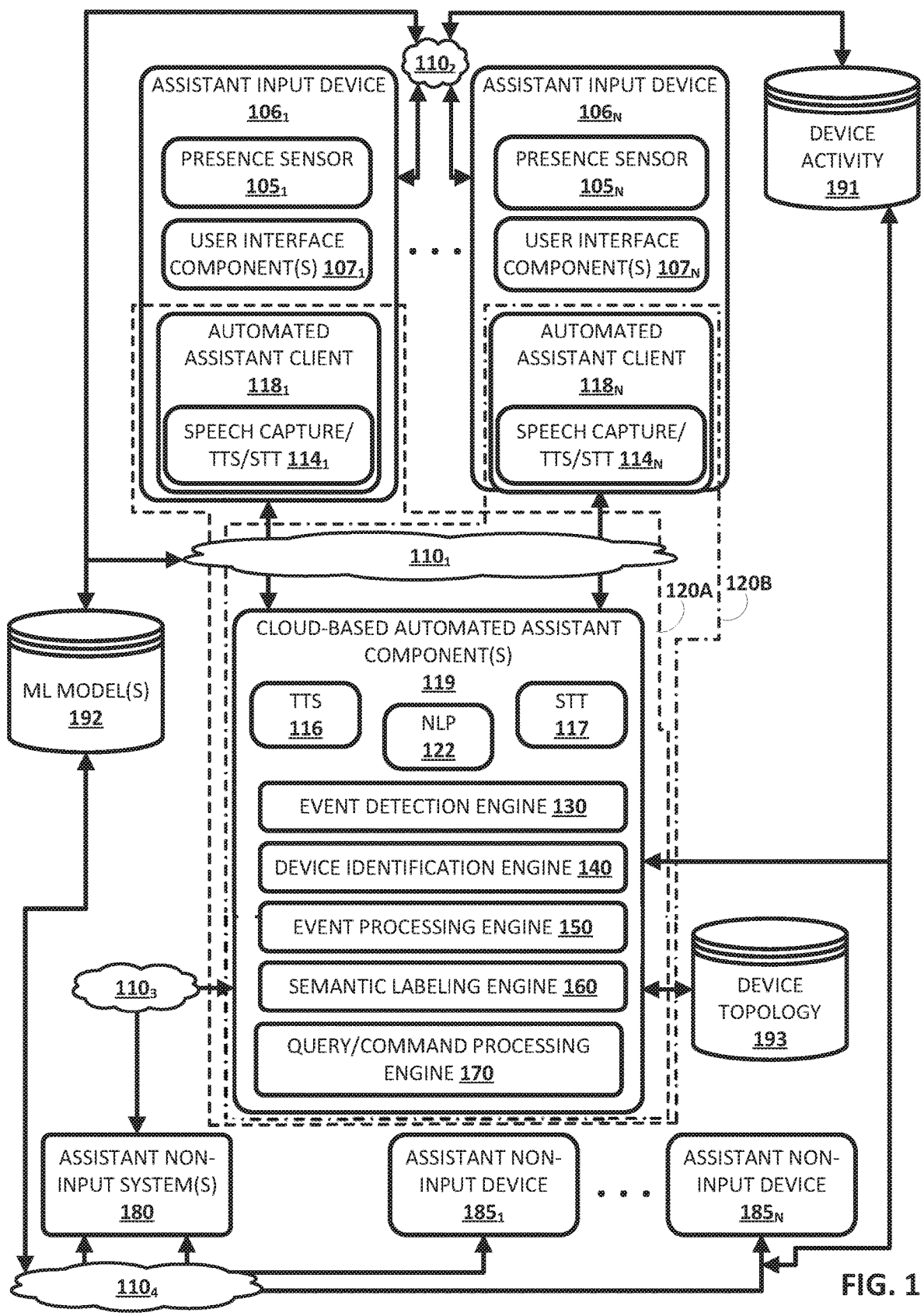
FIG. 1 is a block diagram of an example environment in which implementations disclosed herein may be implemented.

There is a proliferation of smart, multi-sensing network connected devices (also referred to herein as assistant devices) such smart phones, tablet computers, vehicle computing systems, wearable computing devices, smart televisions, interactive standalone speakers (e.g., with or without a display), sound speakers, home alarms, door locks, cameras, lighting systems, treadmills, thermostats, weight scales, smart beds, irrigation systems, garage door openers, appliances, baby monitors, fire alarms, moisture detectors, etc. Often, multiple assistant devices are located within the confines of a structure, such as a home—or located within multiple related structures, such as a user's primary residence and the user's secondary residence, the user's vehicle, and/or the user's work location.

Further, there is a proliferation of assistant devices that each include an automated assistant client that can form a logical instance of an automated assistant (also referred to herein as assistant input devices). These assistant input devices can be devoted solely to assistant functionality (e.g., an interactive standalone speaker and/or standalone audio/visual device including only an assistant client and associated interface, and devoted solely to assistant functionality) or can perform assistant functionality in addition to other functions (e.g., a mobile phone or tablet that includes an assistant client as one of multiple applications). Moreover, some IoT devices can also be assistant input devices. For example, some IoT devices can include an automated assistant client and at least speaker(s) and/or microphone(s) that serve (at least in part) as user interface output and/or input devices for an assistant interface of the automated assistant client. Although some assistant devices may not implement the automated assistant client or have means for interfacing with a user (e.g., speaker(s) and/or microphone(s)), they may still be controlled by the automated assistant (also referred to herein as assistant non-input devices). For example, a smart light bulb may not include an automated assistant client, speaker(s), and/or microphone(s), but commands and/or requests can be transmitted to the smart light bulb, via the automated assistant, to control functionality of the smart light (e.g., turn on/off, dim, change colors, etc.).

Various techniques have been proposed for labeling and/or grouping assistant devices (including both assistant input devices and assistant non-input devices) within an ecosystem of assistant devices. For example, upon adding a new assistant device to the ecosystem, a user associated with the ecosystem can, in a device topology representation of the ecosystem, manually assign a label (or unique identifier) to the new assistant device and/or manually add the new assistant device to a group of assistant devices in the ecosystem via a software application (e.g., via an automated assistant application, a software application associated with the ecosystem, a software application associated with the new assistant device, or the like). As described herein, the label originally assigned to the assistant device may be forgotten by the user or may not be semantically meaningful for how the assistant device is utilized or for where the assistant device is located within the ecosystem. Further, if the assistant device is moved within the ecosystem, the user may be required to manually change the label assigned to the assistant device or/or manually change the group to which the assistant device is assigned via the software application. Otherwise, the label assigned to the assistant device and/or the group to which the assistant device is assigned may not accurately reflect a location or usage of the assistant device and/or may not be semantically meaningful for the assistant device. For example, if a smart speaker labeled "living room speaker" is located in a living room of a primary house of a user, but the smart speaker is moved to a kitchen of the primary house of the user, then the smart speaker may still be labeled "living room speaker", even though the label is not representative of the location of the assistant device, unless the user manually changes the label in a device topology representation for the ecosystem of the primary house of the user.

The device topology representation can include labels (or unique identifiers) that are associated with the respective assistant devices. Further, the device topology representation can specify labels (or unique identifiers) associated with the respective assistant devices. The device attributes for a given assistant device can indicate, for example, one or more input and/or output modalities supported by the respective assistant devices. For instance, a device attribute for a standalone speaker-only assistant client device can indicate that it is capable of providing audible output, but incapable of providing visual output. The device attributes for a given assistant device can additionally or alternatively, for example, identify one or more states, of the given assistant device, that can be controlled; identify a party (e.g., a first-party (1P) or third-party (3P)) that manufactures, distributes, and/or creates the firmware for the assistant device; and/or identify a unique identifier for the given assistant device, such as a 1P or 3P provided fixed identifier or a label assigned to the given assistant device by a user. According to various implementations disclosed herein, the device topology representation can optionally further specify: which smart devices can be controlled locally by which assistant devices; local addresses for locally controllable assistant devices (or local addresses for hubs that can directly locally control those assistant devices); local signal strengths and/or other preference indicators amongst the respective assistant devices. Further, according to various implementations disclosed herein, the device topology representation (or a variation thereof) can be locally stored at each of a plurality of assistant devices for utilization in locally controlling and/or locally assigning labels to assistant devices. Moreover, the device topology representation can specify groups associated with the respective assistant devices that can be defined with various levels of granularity. For instance, multiple smart lights in a living room of a primary house of a user can be considered to belong to a "living room lights" group. Further, if the living room of the primary house also includes a smart speaker, all of the assistant devices located in the living room can be considered to belong to a "living room assistant devices" group.

The automated assistant can detect various events that occur in the ecosystem based on one or more signals generated by one or more of the assistant devices. For example, the automated assistant can process, using an event detection model(s) or rule(s), one or more of the signals to detect these events. Further, the automated assistant can cause one or more actions to be performed based on the output generated based on one or more of the signals for the events that occur in the ecosystem. In some implementations, the event detected may be a device-related event that is associated with one or more of the assistant devices (e.g., assistant input devices and/or assistant non-input devices). For example, a given one of the assistant devices can detect when it is newly added to the ecosystem based on one or more wireless signals generated by the given one of the assistant devices (and optionally a unique identifier associated with the given one of the assistant devices that is included in one or more of the wireless signals). As another example, a given one of the assistant devices can detect when it is moved within the ecosystem based on the given one of the assistant devices being surrounded by one or more different assistant devices that previously surrounded the given one of the assistant devices (and optionally determined based on respective unique identifiers of the one or more different assistant devices). In these implementations, one or more of the actions performed by the automated assistant can include, for example, determining a semantic label for the given one of the assistant devices in response to determining that it is newly introduced to the ecosystem or moved locations within the ecosystem, and causing the semantic label to be assigned to the given one of the assistant devices in a device topology representation of the ecosystem.

In some additional or alternative implementations, the event detected may be an acoustic event captured via respective microphone(s) of one or more assistant devices. The automated assistant can cause audio data that captures the acoustic event to be processed using acoustic event model(s). The acoustic event detected by the acoustic event model(s) can include, for example, detecting a hotword that invokes an automated assistant included in a spoken utterance using hotword detection model(s), detecting ambient noise in the ecosystem (and optionally while speech reception is active at a given one of the assistant devices) in the ecosystem using ambient noise detection model(s), detecting a particular sound (e.g., glass breaking, a dog barking, a cat meowing, a doorbell ringing, a smoke alarm sounding, or a carbon monoxide detector sounding) in the ecosystem using sound detection model(s), and/or other acoustic-related events that can be detected using respective acoustic event detection model(s). For example, assume audio data is detected via respective microphone(s) of at least one of the assistant devices. In this example, the automated assistant can cause the audio data to be processed by the hotword detection model(s) of the at least one of the assistant device(s) to determine whether the audio data captures a hotword to invoke the automated assistant. Further, the automated assistant can additionally or alternatively cause the audio data to be processed by the ambient noise detection model(s) of the at least one of the assistant device(s) to classify any ambient (or background) noise captured in the audio data into one or more disparate semantic categories of ambient noise (e.g., movie or television sounds, cooking sounds, and/or other disparate categories of sounds). Moreover, the automated assistant can additionally or alternatively cause the audio data to be processed by the sound detection model(s) of the at least one of the assistant device(s) to determine whether any particular sounds are captured in the audio data.

Implementations described herein relate to inferring determining semantic labels for assistant devices based on one or more signals generated by each of the respective devices. Those implementations further relate to assigning the semantic labels to the assistant devices in a device topology representation of the ecosystem. The semantic labels can be automatically assigned to the assistant devices or can be presented to the user associated with the ecosystem to solicit a selection of one or more of the semantic labels to be assigned to the assistant devices. Yet further, those implementations relate to subsequently using the semantic labels in processing a spoken utterance to determine whether the spoken utterance includes a term or phrase that matches any of the semantic labels, and when it is determined the spoken utterance includes a term or phrase that matches one of the semantic labels, using an assistant device associated with the matching one of the semantic labels to satisfy the spoken utterance.

Now turning to FIG. 1, an example environment in which techniques disclosed herein may be implemented is illustrated. The example environment includes a plurality of assistant input devices $106_{1-N}$ (also referred to herein simply as "assistant input devices 106"), one or more cloud-based automated assistant components 119, one or more assistant non-input systems 180, one or more assistant non-input devices $185_{1-N}$ (also referred to herein simply as "assistant non-input devices 185"), a device activity database 191, a machine learning ("ML") model(s) database, and a device topology database 193. The assistant input devices 106 and the assistant non-input device 185 of FIG. 1 may also be referred to collectively herein as "assistant devices".

One or more (e.g., all) of the assistant input devices 106 can execute a respective instance of a respective automated assistant client $118_{1-N}$. However, in some implementations one or more of the assistant input devices 106 can optionally lack an instance of the respective automated assistant client $118_{1-N}$, and still include engine(s) and hardware components for receiving and processing user input directed to an automated assistant (e.g., microphone(s), speaker(s), speech recognition engine(s), natural language processing engine(s), speech synthesis engine(s), and so on). An instance of the automated assistant client $118_{1-N}$ can be an application that is separate from an operating system of the respective assistant input devices 106 (e.g., installed "on top" of the operating system)—or can alternatively be implemented directly by the operating system of the respective assistant input devices 106. As described further below, each instance of the automated assistant client $118_{1-N}$ can optionally interact with one or more cloud-based automated assistant components 119 in responding to various requests provided by respective user interface components $107_{1-N}$ of any one of the respective assistant input devices 106. Further, and as also described below, other engine(s) of the assistant input devices 106 can optionally interact with one or more of the cloud-based automated assistant components 119.

One or more the cloud-based automated assistant components 119 can be implemented on one or more computing systems (e.g., server(s) collectively referred to as a "cloud" or a "remote" computing system) that are communicatively coupled to respective assistant input devices 106 via one or more local area networks ("LANs," including Wi-Fi LANs, Bluetooth networks, near-field communication networks, mesh networks, etc.) and/or wide area networks ("WANs,", including the Internet, etc.). The communicative coupling of the cloud-based automated assistant components 119 with the assistant input devices 106 is indicated generally by $110_1$ of FIG. 1. Also, in some embodiments, the assistant input devices 106 may be communicatively coupled with each other via one or more networks (e.g., LANs and/or WANs), indicated generally by $110_2$ of FIG. 1.

The one or more cloud-based automated assistant components 119 can also be communicatively coupled with the one or more assistant non-input systems 180 via one or more networks (e.g., LANs and/or WANs). The communicative coupling of the cloud-based automated assistant components 119 with the assistant non-input system(s) 180 is indicated generally by $110_3$ of FIG. 1. Further, assistant non-input system(s) 180 can each be communicatively coupled to one or more (e.g., groups) of the assistant non-input devices 185 via one or more networks (e.g., LANs and/or WANs). For example, a first assistant non-input system 180 can be communicatively coupled with, and receive data from, a first group of one or more of the assistant non-input devices 185, a second assistant non-input system 180 can be communicatively coupled with, and receive data from, a second group of one or more of the assistant non-input devices 185, and so on. The communicative coupling of the assistant non-input system(s) 180 with the assistant non-input devices 185 is indicated generally by $110_4$ of FIG. 1.

An instance of an automated assistant client 118, by way of its interactions with one or more of the cloud-based automated assistant components 119, may form what appears to be, from a user's perspective, a logical instance of an automated assistant 120 with which the user may engage in a human-to-computer dialog. Two instances of such an automated assistant 120 are depicted in FIG. 1. A first automated assistant 120A encompassed by a dashed line includes automated assistant client $118_1$ of assistant input device $106_1$ and one or more cloud-based automated assistant components 119. A second automated assistant 120B encompassed by a dash-dash-dot line includes automated assistant client 118N of assistant input device 106N and one or more cloud-based automated assistant components 119. It thus should be understood that each user that engages with an automated assistant client 118 executing on one or more of the assistant input devices 106 may, in effect, engage with his or her own logical instance of an automated assistant 120 (or a logical instance of automated assistant 120 that is shared amongst a household or other group of users). For the sake of brevity and simplicity, the term "automated assistant" as used herein will refer to the combination of an automated assistant client 118 executing on a respective one of the assistant input devices 106 and one or more of the cloud-based automated assistant components 119 (which may be shared amongst multiple automated assistant clients 118). Although only a plurality of assistant input devices 106 are illustrated in FIG. 1, it is understood that cloud-based automated assistant component(s) 119 can additionally serve many additional groups of assistant input devices.

The assistant input devices 106 may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), an interactive standalone speaker (e.g., with or without a display), a smart appliance such as a smart television, a wearable apparatus of the user that includes a computing device (e.g., a watch of the user having a computing device, glasses of the user having a computing device, a virtual or augmented reality computing device), and/or any IoT device capable of receiving user input directed to the automated assistant 120. Additional and/or alternative assistant input devices may be provided. The assistant non-input devices 185 may include many of the same devices as the assistant input devices 106, but are not capable of receiving user input directed to automated assistant 120 (e.g., do not include user interface input component(s)). Although the assistant non-input devices 185 do not receive user input directed to the automated assistant 120, the assistant non-input devices 185 may still be controlled by the automated assistant 120.

In some implementations, the plurality of assistant input devices 106 and assistant non-input devices 185 can be associated with each other in various ways in order to facilitate performance of techniques described herein. For example, in some implementations, the plurality of assistant input devices 106 and assistant non-input devices 185 may be associated with each other by virtue of being communicatively coupled via one or more networks (e.g., via the network(s) 110 of FIG. 1). This may be the case, for instance, where the plurality of assistant input devices 106 and assistant non-input devices 185 are deployed across a particular area or environment, such as a home, a building, and so forth. Additionally or alternatively, in some implementations, the plurality of assistant input devices 106 and assistant non-input devices 185 may be associated with each other by virtue of them being members of a coordinated ecosystem that are at least selectively accessible by one or more users (e.g., an individual, a family, employees of an organization, other predefined groups, etc.). In some of those implementations, the ecosystem of the plurality of assistant input devices 106 and assistant non-input devices 185 can be manually and/or automatically associated with each other in a device topology representation of the ecosystem that is stored in the device topology database 193.

The assistant non-input system(s) 180 can include one or more first-party (1P) systems and/or one or more third-party (3P) systems. A 1P system references a system that is controlled by a party that is the same as the party that controls the automated assistant 120 being referenced herein. A 3P system, as used herein, references a system that is controlled by a party that is distinct from the party that controls the automated assistant 120 being referenced herein.

The assistant non-input system(s) 180 can receive data from the assistant non-input devices 185 and/or the one or more cloud-based automated assistant components 119 that are communicatively coupled thereto (e.g., via the networks 110 of FIG. 1), and selectively transmit data (e.g., state(s), state change(s), and/or other data) to the assistant non-input devices 185 and/or the one or more cloud-based automated assistant components 119. For example, assume assistant non-input device $185_1$ is a smart doorbell IoT device. In response to an individual pressing a button on the doorbell IoT device, the doorbell IoT device can transmit corresponding data to one of the assistant non-input system(s) 180 (e.g., one of the assistant non-input system(s) managed by a manufacturer of the doorbell that may be a 1P system or 3P system). The one of the assistant non-input system(s) 180 can determine a change in a state of the doorbell IoT device based on such data. For instance, the one of the assistant non-input system(s) 180 can determine a change in the doorbell from an inactive state (e.g., no recent pressing of the button) to an active state (recent pressing of the button), and the change in the doorbell state can be transmitted to the one or more cloud-based automated assistant components 119 and/or one or more of the assistant input devices 106 (e.g., via the networks 110 of FIG. 1). Notably, although user input is received at the assistant non-input device $185_1$ (e.g., the pressing of the button on the doorbell), the user input is not directed to the automated assistant 120 (hence the term "assistant non-input device"). As another example, assume assistant non-input device $185_1$ is a smart thermostat IoT device that has microphone(s), but the smart thermostat does not include the automated assistant client 118. An individual can interact with the smart thermostat (e.g., using touch input or spoken input) to change a temperature, set particular values as setpoints for controlling an HVAC system via the smart thermostat, and so on. However, the individual cannot communicate directly with the automated assistant 120 via the smart thermostat, unless the smart thermostat includes the automated assistant client 118.

In various implementations, the one or more cloud-based automated assistant components 119 may further include various engines. For example, as shown in FIG. 1, the one or more cloud-based automated assistant components 119 may further include an event detection engine 130, a device identification engine 140, an event processing engine 150, a semantic labeling engine 160, and a query/command processing engine 170. Although these various engines are depicted as the one or more cloud-based automated assistant components 119 in FIG. 1, it should be understood that is for the sake of example and is not meant to be limiting. For example, the assistant input devices 106 and/or the assistant non-input devices 185 may include one or more of these various engines. As another example, these various engines can be distributed across the assistant input devices 106, the assistant non-input devices 185 may include one or more of these various engines, and/or, the one or more cloud-based automated assistant components 119.

In some implementations, the event detection engine 130 can detect various events that occur in the ecosystem. In some versions of those implementations, the event detection engine 130 can determine when a given one of the assistant input devices 106 and/or a given one of the assistant non-input devices 185 (e.g., a given one of the assistant devices) is newly added to the ecosystem or moved locations within the ecosystem. For example, the event detection engine 130 can determine when a given one of the assistant devices is newly added to the ecosystem based on one or more wireless signals detected over the network(s) 110 and via the device identification engine 140. For instance, when the given one of the assistant devices is newly connected to one or more of the networks 110, the given one of the assistant devices can broadcast a signal that indicates it is newly added to the network 110. As another example, the event detection engine 130 can determine when a given one of the assistant devices has moved locations within the ecosystem based on one or more wireless signals detected over the network(s) 110. In these examples, the device identification engine 140 can process the signals to determine that the given one of the assistant devices is newly added to the network 110 and/or to determine that the given one of the assistant devices has moved locations within the ecosystem. The one or more wireless signals detected by the device identification engine 140 can be, for example, a network signal and/or an acoustic signal that is human-imperceptive and that optionally includes respective unique identifiers for the given one of the assistant devices and/or other assistant devices that are locationally proximate to the given one of the assistant devices. For instance, when the given one of the assistant devices is moved locations within the ecosystem, the device identification engine 140 can detect one or more wireless signals being transmitted by other assistant devices that are locationally proximate to the given one of the assistant devices. These signals can be processed to determine one or more other assistant devices that are locationally proximate to the given one of the assistant devices differ from one or more assistant devices that were previously locationally proximate to the given one of the assistant devices.

In some further versions of those implementations, the automated assistant 120 can cause the given one of the assistant devices that is newly added to the ecosystem or moved locations within the ecosystem to be assigned to a group of assistant devices (e.g., in the device topology representation of the ecosystem stored in the device topology database 193). For example, in implementations where the given one of the assistant devices is newly added to the ecosystem, the given one of the assistant devices can be added to an existing group of assistant devices or a new group of assistant devices that includes the given one of the assistant devices can be created. For instance, if the given one of the assistant devices is locationally proximate to a plurality of assistant devices belonging to a "kitchen" group (e.g., a smart oven, a smart coffee maker, an interactive standalone speaker associated with a unique identifier or label that indicates it is located in the kitchen, and/or other assistant devices), then the given one of the assistant devices can be added to the "kitchen" group, or a new group can be created. As another example, in implementations where the given one of the assistant devices is moved locations within the ecosystem, the given one of the assistant devices can be added to an existing group of assistant devices, or a new group of assistant devices that includes the given one of the assistant devices can be created. For instance, if the given one of the assistant devices was locationally proximate to a plurality of assistant devices belonging to the aforementioned "kitchen" group, but is now locationally proximate to a plurality of assistant devices belonging to a "garage" group (e.g., a smart garage door, a smart door lock, and/or other assistant devices), then the given one of the assistant devices can be removed from the "kitchen" group and added to the "garage" group.

In some additional or alternative versions of those implementations, the event detection engine 130 can detect occurrences of acoustic events. The occurrences of the acoustic event can be detected based on audio data that is received at one or more of the assistant input devices 106 and/or one or more of the assistant non-input devices 185 (e.g., one or more of the assistant devices). The audio data that is received at the one or more of the assistant devices can be processed by event detection model(s) stored in the ML model(s) database 192. In these implementations, each of the one or more assistant devices that detect occurrences of the acoustic events include respective microphone(s).

In some further versions of those implementations, the occurrences of the acoustic event can include ambient noise captured in audio data at one or more of the assistant devices (and optionally only include occurrences of ambient noise that are detected when speech reception is active at the one or more of the assistant devices). The ambient noise detected at each of the one or more assistant devices can be stored in the device activity database 191. In these implementations, the event processing engine 150 can process the ambient noise detected at the one or more assistant devices using ambient noise detection model(s) (e.g., stored in the ML model(s) database 192) that are trained to classify the ambient noise into one or more of a plurality of disparate semantic categories based on measure(s) generated in processing the ambient noise using the ambient noise detection model(s). The plurality of disparate categories can include, for example, a movie or television sounds category, a cooking sounds category, a music sounds category, a garage or workshop sounds category, a patio sounds category, and/or other disparate categories of sounds that are semantically meaningful. For instance, if the event processing engine 150 determines that ambient noise processed using the ambient noise detection model(s) includes sounds that correspond to a microwave sounding, food sizzling on a skillet, a food processor processing food, etc., then the event processing engine 150 can classify the ambient noise into a cooking sounds category. As another example, if the event processing engine 150 determines that ambient noise processed using the ambient noise detection model(s) includes sounds that correspond to a saw buzzing, a hammer hammering, etc., then the event processing engine 150 can classify the ambient noise into a garage or workshop category. The classification of the ambient noise detected at particular devices may also be utilized as device-specific signals that are utilized in inferring semantic labels for the assistant devices (e.g., described with respect to the semantic labeling engine 160).

In some additional or alternative versions of those further implementations, the occurrences of the acoustic event can include a hotword or particular sound detected at one or more of the assistant devices. In these implementations, the event processing engine 150 can process the audio data detected at the one or more assistant devices using hotword detection model(s) trained to determine whether the audio data includes a particular word or phrase that invokes the automated assistant 120 based on measure(s) generated in processing the audio data using the hotword detection model(s). For example, the event processing engine 150 can process the audio data to determine whether the audio data captures a spoken utterance of a user that includes "Assistant", "Hey assistant", "Okay, assistant", and/or any other word or phrase that invokes the automated assistant. Further, the measure(s) generated using the hotword detection model(s) can include a respective confidence level or probability that is indicative of whether or not the audio data includes a term or phrase that invokes the automated assistant 120. In some versions of these implementations, the event processing engine 150 can determine that the audio data captures the term or phrase if the measure(s) satisfy a threshold. For instance, if the event processing engine 150 generates a measure of 0.70 that is associated with the audio data capturing a term or phrase that invokes the automated assistant 120 and the threshold is 0.65, then the event processing engine 150 may determine that audio data captures the term or phrase that invokes the automated assistant 120.

In these implementations, the event processing engine 150 can additionally or alternatively process the audio data detected at the one or more assistant devices using sound detection model(s) trained to determine whether the audio data includes a particular sound based on measure(s) generated in processing the audio data using the sound detection model(s). The particular sounds can include, for example, glass breaking, a dog barking, a cat meowing, a doorbell ringing, a smoke alarm sounding, or a carbon monoxide detector sounding. For example, the event processing engine 150 can process the audio data to determine whether the audio data captures any of these particular sounds. In this example, a single sound detection model can be trained to determine whether multiple of the particular sounds are captured in the audio data, or multiple sounds detection models can be trained to determine whether a given particular sound is captured in the audio data. Further, the measure(s) generated using the sound detection model(s) can include a respective confidence level or probability that is indicative of whether or not the audio data includes the particular sound. In some versions of these implementations, the event processing engine 150 can determine that the audio data captures the particular sound if the measure(s) satisfy a threshold. For instance, if the event processing engine 150 generates a measure of 0.70 that is associated with the audio data capturing a sound of glass breaking and the threshold is 0.65, then the event processing engine 150 may determine that audio data captures the sound of glass breaking.

In various implementations, the occurrence of the acoustic event may be captured by multiple assistant devices in the ecosystem. For instance, multiple assistant devices in the environment may capture temporally corresponding audio data (e.g., temporally corresponding in that respective audio data is detected at the multiple assistant devices at the same time or within a threshold duration of time). In these implementations, and in response to a given assistant device detecting audio data in the ecosystem, the device identification engine 140 can identify one or more additional assistant devices that should also have detected temporally corresponding audio data that also captures the acoustic event. For example, the device identification engine 140 can identify one or more of the additional assistant devices that should also have detected temporally corresponding audio data that also captures the acoustic event based on the one or more additional assistant devices historically detecting temporally corresponding audio data that also captures the acoustic event. In other words, the device identification engine 140 can anticipate that the one or more additional assistant devices should also capture audio data that includes the acoustic events because the given assistant device and the one or more additional assistant devices have historically captured temporally corresponding audio data that includes the same acoustic.

In various implementations, one or more device-specific signals generated or detected by the respective assistant devices can be stored in device activity database 191. In some implementations, the device activity database 191 can correspond to a portion of memory dedicated to the device activity of that specific assistant device. In some additional or alternative implementations, the device activity database 191 can correspond to memory of a remote system in communication with the assistant devices (e.g., via the networks 110 of FIG. 1). This device activity can be utilized in generating candidate semantic labels for a given one of the assistant devices (e.g., described with respect to the semantic labelling engine 160). The device activity can include, for example, queries or requests received at the respective assistant devices (and/or a semantic category associated with each of the plurality of queries or requests), commands executed at the respective assistant devices (and/or a semantic category associated with each of the plurality of commands), ambient noise detected at the respective assistant devices (and/or a semantic category associated with various instances of the ambient noise), unique identifiers or labels of any assistant devices that are locationally proximate to a given assistant device (e.g., identified via the event detection engine 140), user preferences of a user associated with the ecosystem that are determined based on user interactions with the plurality of assistant devices in the ecosystem (e.g., browsing history, search history, purchase history, music history, movie or television history, and/or any other user interactions associated with the plurality of assistant devices), and/or any other data that is received, generated, and/or executed by the respective assistant devices.

In some implementations, the semantic labeling engine 160 can process one or more device-specific signals to generate candidate semantic labels for a given one of the assistant devices (e.g., a given one the assistant input devices 106 and/or a given one of the assistant non-input devices 185) based on the one or more device-specific signals. In some versions of those implementations, the given assistant device, for which the candidate semantic labels are generated, can be identified in response to determining that the given assistant device is newly added to the ecosystem and/or moved locations within the ecosystem. In some additional or alternative versions of those implementations, the given assistant device, for which the candidate semantic labels are generated, can be identified periodically (e.g., once a month, once every six months, once a year and so on). In some additional or alternative versions of those implementations, the given assistant device, for which the candidate semantic labels are generated, can be identified in response to determining that the portion of the ecosystem in which the given assistant device is located has been repurposed (e.g., a room in a primary dwelling of ecosystem has been repurposed from a den to a bedroom). In these implementations, the given assistant device can be identified utilizing the event detection engine 130. Identifying the given assistant device in these and other manners are described with respect to FIGS. 2A and 2B.

In some implementations, the semantic labeling engine 160 can select a given semantic label, from among the candidate semantic labels, for a given assistant device based on one or more of the device-specific signals. Generating the candidate semantic labels for a given assistant device and selecting a given semantic label, from among the candidate semantic labels, based on the one or more device-specific labels is described below (e.g., with respect to FIGS. 2A and 2B).

In implementations where the candidate semantic labels for the given assistant device are generated based on the queries, requests, and/or commands stored in the device activity database 191 (or text corresponding thereto), the queries, requests, and/or commands can be processed using a semantic classifier (e.g., stored in ML model(s) database 192) to index the device activity, for the given assistant device, into one or more different semantic categories that correspond to disparate types of queries, requests, and/or commands. The candidate semantic labels can be generated based on the semantic categories into which the queries, commands, and/or requests are classified into, and the given semantic label that is selected for the given assistant device can be selected based on a quantity of the plurality of queries, requests, and/or commands that are classified in a given semantic category. For example, assume that the given assistant device has previously received nine queries related to obtaining cooking recipes and two commands related to controlling smart lights in the ecosystem. In this example, the candidate semantic labels can include, for example, a first semantic label of "kitchen device" and a second semantic label of "control smart lights device". Further, the semantic labeling engine 160 can select the first semantic label of "kitchen device" as the given semantic label for the given assistant device since the historical usage of the given assistant device indicates that it is primarily used for cooking-related activities.

In some implementations, the semantic classifier(s) stored in the ML model(s) database 192 can be natural language understanding engine(s) (e.g., implemented by the NLP module 122 described below). Intent(s) that are determined based on processing the queries, commands, and/or requests that were previously received at the assistant devices can be mapped to one or more of the semantic categories. Notably, the plurality of disparate semantic categories described herein can be defined with various levels of granularity. For example, a the semantic categories can be associated with a genus category of smart device commands and/or for species category(ies) of that genus class, such as a category of smart lighting commands, a category of smart thermostat commands, and/or a category of smart camera commands. Put another way, each category can have a unique set of intent(s) associated therewith that are determined by the semantic classifier(s), although some intent(s) of a category may also be associated with additional category(ies). In some additional or alternative implementations, the semantic classifier(s) stored in the ML model(s) database 192 can be utilized to generate a text embedding (e.g., a lower-dimensional representation, such as a word2vec representation) corresponding to text of the queries, commands, and/or requests. These embeddings can be points within an embedding space where words or phrases that are semantically similar are associated with the same or similar portions of the embedding space. Further, these portions of the embedding space can be associated with one or more of the plurality of disparate semantic categories, and a given one of the embeddings can be classified into a given one of the semantic categories if a distance metric between the given one of the embeddings and one or more of the portions of the embedding space satisfy(ies) a distance threshold. For instance, cooking-related words or phrases can be associated with a first portion of the embedding space that is associated with a "cooking" semantic label, weather-related words or phrases can be associated with a second portion of the embedding space that is associated with a "weather" semantic label, and so on.

In implementations where the one or more device-specific signals additionally or alternatively include the ambient noise activity, instances of the ambient noise can be processed using ambient noise detection model(s) (e.g., stored in ML model(s) database 192) to index the device activity, for the given assistant device, into one or more different semantic categories that correspond to disparate types of ambient noise. The candidate semantic labels can be generated based on the semantic categories into which the instances of the ambient noise are classified into, and the given semantic label that is selected for the given assistant device can be selected based on a quantity of the instances of ambient that are classified in a given semantic category. For instance, assume that ambient noise detected at the given assistant device (and optionally only when speech recognition is active) primarily includes ambient noise that is classified as cooking sounds. In this example, the semantic labeling engine 160 can select the semantic label of "kitchen device" as the given semantic label for the given assistant device since the ambient noise captured in audio data indicates the device is located proximate to cooking-related activities.

In some implementations, the ambient noise detection model(s) stored in the ML model(s) database 192 can be trained to detect a particular sound, and it can be determined whether an instance of ambient noise includes the particular sound based on output(s) generated across the ambient noise detection model(s). The ambient noise detection model(s) can be trained using, for example, supervised learning techniques. For example, a plurality of training instances can be obtained. Each of the training instances can include training instance input that includes ambient noise, and corresponding training instance output that includes an indication of whether the training instance input includes the particular sound(s) for which the ambient noise detection model(s) is being trained to detect. For instance, if the ambient noise detection model(s) is being trained to detect the sound of glass breaking, training instances that include the sound of glass breaking can be assigned a label (e.g., "Yes") or value (e.g., "1") and training instances that do not include the sound of glass breaking can be assigned a different label (e.g., "No") or value (e.g., "0"). In some additional or alternative implementations, the ambient noise detection model(s) stored in the ML model(s) database 192 can be utilized to generate an audio embedding (e.g., a lower-dimensional representation of the instances of the ambient noise) based on the instances of the ambient noise (or acoustic features thereof, such as mel-Cepstral frequency coefficients, raw audio waveforms, and/or other acoustic features). These embeddings can be points within an embedding space where similar sounds (or acoustic features that capture the sounds) are associated with the same or similar portions of the embedding space. Further, these portions of the embedding space can be associated with one or more of the plurality of disparate semantic categories, and a given one of the embeddings can be classified into a given one of the semantic categories if a distance metric between the given one of the embeddings and one or more of the portions of the embedding space satisfy(ies) a distance threshold. For instance, instances of glass breaking can be associated with a first portion of the embedding space that is associated with a "glass breaking" sound, instances of a doorbell ringing can be associated with a second portion of the embedding space that is associated with a "doorbell" sound, and so on.

In implementations where the one or more device-specific signals additionally or alternatively include the unique identifiers or labels of additional assistant device(s) that are locationally proximate to the given assistant device, the candidate semantic labels can be generated based on the those unique identifiers or labels, and the given semantic label that is selected for the given assistant device can be selected based on one or more of the unique identifiers or labels of the additional assistant device(s). For instance, assume that a first label of "smart oven" is associated with a first assistant device that is locationally proximate to the given assistant device and a second label of "smart coffee maker" is associated with a second assistant device that is locationally proximate to the given assistant device. In this example, the semantic labeling engine 160 can select the semantic label of "kitchen device" as the given semantic label for the given assistant device since the labels associated with the additional assistant devices that are locationally proximate to the given assistant device are cooking-related. The unique identifiers or labels can be processed using the semantic classifier(s) stored in the ML model(s) database 192 in the same or similar manner described above with respect to processing the queries, commands, and/or requests.

In implementations where the candidate semantic labels for the given assistant device are generated based on the user preferences, the user preferences can be processed using the semantic classifier (e.g., stored in ML model(s) database 192) to index the user preferences into one or more different semantic categories that correspond to disparate types of user preferences. The candidate semantic labels can be generated based on the semantic categories into which the user preferences are classified into, and the given semantic label that is selected for the given assistant device can be selected based on a given semantic category into which the user preferences are classified that is related to the given assistant device. For example, assume that the user preferences indicate that a user associated with the ecosystem likes cooking, and likes a fictitious chef named Johnny Flay. In this example, the candidate semantic labels can include, for example, a first semantic label of "cooking device" and a second candidate semantic label of "Johnny Flay device". In some versions of those implementations, the utilization of the user preferences as a device-specific signal for generating the one or more candidate semantic labels may be in response to receiving user input to assign semantic labels to the assistant devices based on the user preferences.

In some implementations, the semantic labelling engine 160 can automatically assign the given semantic label to the given assistant device in a device topology representation of the ecosystem (e.g., stored in the device topology database 193). In some additional or alternative implementations, the semantic labelling engine 160 can cause the automated assistant 120 to generate a prompt that includes the candidate semantic labels. The prompt can solicit, from a user that is associated with the ecosystem, a selection of one of the candidate labels as the given semantic label. Further, the prompt can be rendered visually and/or audibly at a given one of the assistant devices (that may or may not be the given assistant device to which the given semantic label is being assigned) and/or a client device (e.g., a mobile device) of the user. In response to receiving the selection of one of the candidate labels as the given semantic label, the given semantic label that is selected can be assigned to the given assistant device in the device topology representation of the ecosystem (e.g., stored in the device topology database 193). In some versions of these implementations, the given semantic label that is assigned to the given assistant device can be added to a list of semantic labels for the given assistant device. In other words, multiple semantic labels can be associated with the given assistant device. In other versions of these implementations, the given semantic label that is assigned to the given assistant device can supplant any other semantic label for the given assistant device. In other words, only a single semantic label may be associated with the given assistant device.

In some implementations, the query/command processing engine 170 can process a query, request, or command that is directed to the automated assistant 120 and that is received via one or more of the assistant input devices 106. The query/command processing engine 170 can process the query, request, or command to select one or more of the assistant devices to satisfy the query or command. Notably, the one or more of the assistant devices that are selected to satisfy the query or command may differ from the one or more of the assistant input devices 106 that received the query or command. The query/command processing engine 170 can select the one or more assistant devices to satisfy the spoken utterance based on one or more criteria. The one or more criteria can include, for example, proximity of one or more of the devices to the user that provided the spoken utterance (e.g., determined using the presence sensors 105 described below), device capabilities of one or more of the devices in the ecosystem, semantic label(s) assigned to the one or more assistant devices, and/or other criteria for selecting assistant devices to satisfy spoken utterances.

For example, assume a display device is needed to satisfy the spoken utterance. In this example, candidate assistant devices considered in selecting the given assistant device to satisfy the spoken utterance may be limited to those that include the display device. If multiple assistant devices in the ecosystem include the display device, then the given assistant device that includes that display device and is most proximate to the user may be selected to satisfy the utterance. In contrast, in implementations where only speaker(s) are needed to satisfy the spoken utterance (e.g., a display device is not needed to satisfy the spoken utterance), candidate assistant devices considered in selecting the given assistant device to satisfy the spoken utterance may include those that have speaker(s) regardless of whether they include the display device.

As another example, assume the spoken utterance includes a semantic property that matches a semantic label assigned to a given assistant device. The query/command processing engine 170 can determine that the semantic property of the spoken utterance matches the semantic label assigned to the given assistant device by generating a first embedding corresponding to one or more terms of the spoken utterance (or text corresponding thereto) and a second embedding corresponding to one or more terms of the semantic label assigned to the given assistant device, and comparing the embeddings to determine whether a distance metric between the embeddings satisfies a distance threshold which indicates that the embeddings match (e.g., whether it is an exact match or a soft match). In this example, the query/command processing engine 170 can select the given assistant device to satisfy the spoken utterance based on spoken utterance matching the semantic label (and optionally in addition to or in lieu of proximity of the user that provided the spoken utterance to the given assistant device). In this manner, selection of the assistant devices to satisfy the spoken utterance can be biased towards the semantic labels that are assigned to the assistant devices as described herein.

In various implementations, one or more of the assistant input devices 106 may include one or more respective presence sensors $105_{1-N}$ (also referred to herein simply as "presence sensors 105") that are configured to provide, with approval from corresponding user(s), signals indicative of detected presence, particularly human presence. In some of those implementations, the automated assistant 120 can identify one or more of the assistant input devices 106 to satisfy a spoken utterance from a user that is associated with the ecosystem based at least in part of presence of the user at or one or more of the assistant input devices 106. The spoken utterance can be satisfied by rendering responsive content (e.g., audibly and/or visually) at one or more of the assistant input devices 106, by causing one or more of the assistant input devices 106 to be controlled based on the spoken utterance, and/or by causing one or more of the assistant input devices 106 to perform any other action to satisfy the spoken utterance. As described herein, the automated assistant 120 can leverage data determined based on the respective presence sensors 105 in determining those assistant input devices 106 based on where a user is near or was recently near, and provide corresponding commands to only those assistant input devices 106. In some additional or alternative implementations, the automated assistant 120 can leverage data determined based on the respective presence sensors 105 in determining whether any user(s) (any users or specific users) are currently proximal to any of the assistant input devices 106, and can optionally suppress provision of commands based it is determined that no users (any users or specific users) are proximal to any of the assistant input devices 106.

The respective presence sensors 105 may come in various forms. Some assistant input devices 106 may be equipped with one or more digital cameras that are configured to capture and provide signal(s) indicative of movement detected in their fields of view. Additionally or alternatively, some assistant input devices 106 may be equipped with other types of light-based presence sensors 105, such as passive infrared ("PIR") sensors that measure infrared ("IR") light radiating from objects within their fields of view. Additionally or alternatively, some assistant input devices 106 may be equipped with presence sensors 105 that detect acoustic (or pressure) waves, such as one or more microphones. Moreover, in addition to the assistant input devices 106, one or more of the assistant non-input devices 185 can additionally or alternatively include respective presence sensors 105 described herein, and signals from such sensors can additionally be utilized by the automated assistant 120 in determining whether and/or how to satisfy spoken utterances according to implementations described herein.

Additionally or alternatively, in some implementations, the presence sensors 105 may be configured to detect other phenomena associated with human presence or device presence in the ecosystem. For example, in some embodiments, a given one of the assistant devices may be equipped with a presence sensor 105 that detects various types of wireless signals (e.g., waves such as radio, ultrasonic, electromagnetic, etc.) emitted by, for instance, other assistant devices carried/operated by a particular user (e.g., a mobile device, a wearable computing device, etc.) and/or other assistant devices in the ecosystem (e.g., described with respect to the event detection engine 130). For example, some of the assistant devices may be configured to emit waves that are imperceptible to humans, such as ultrasonic waves or infrared waves, that may be detected by one or more of the assistant input devices 106 (e.g., via ultrasonic/infrared receivers such as ultrasonic-capable microphones).

Additionally or alternatively, various assistant devices may emit other types of human-imperceptible waves, such as radio waves (e.g., Wi-Fi, Bluetooth, cellular etc.) that may be detected by other assistant devices carried/operated by a particular user (e.g., a mobile device, a wearable computing device, etc.) and used to determine an operating user's particular location. In some implementations, Wi-Fi triangulation may be used to detect a person's location, e.g., based on Wi-Fi signals to/from the assistant device. In other implementations, other wireless signal characteristics, such as time-of-flight, signal strength, etc., may be used by various assistant devices, alone or collectively, to determine a particular person's location based on signals emitted by the other assistant devices carried/operated by the particular user.

Additionally or alternatively, in some implementations, one or more of the assistant input devices 106 may perform voice recognition to recognize a user from their voice. For example, some instances of the automated assistant 120 may be configured to match a voice to a user's profile, e.g., for purposes of providing/restricting access to various resources. In some implementations, movement of the speaker may then be determined, e.g., by the presence sensors 105 of the assistant devices. In some implementations, based on such detected movement, a location of the user may be predicted, and this location may be assumed to be the user's location when any content is caused to be rendered at the assistant devices based at least in part on proximity of those assistant device(s) to the user's location. In some implementations, the user may simply be assumed to be in the last location at which he or she engaged with the automated assistant 120, especially if not much time has passed since the last engagement.

Each of the assistant input devices 106 further includes respective user interface component(s) $107_{1-N}$ (also referred to herein simply as "user interface component(s) 107"), which can each include one or more user interface input devices (e.g., microphone, touchscreen, keyboard) and/or one or more user interface output devices (e.g., display, speaker, projector). As one example, user interface components $107_1$ of assistant input device $106_1$ can include only speaker(s) and microphone(s), whereas user interface components 107N of assistant input device 106N can include speaker(s), a touchscreen, and microphone(s). Additionally or alternatively, in some implementations, the assistant non-input devices 185 may include one or more user interface input devices and/or one or more user interface output devices of the user interface component(s) 107, but the user input devices (if any) for the assistant non-input devices 185 may not allow the user to directly interact with the automated assistant 120.

Each of the assistant input devices 106 and/or any other computing device(s) operating one or more of the cloud-based automated assistant components 119 may include one or more memories for storage of data and software applications, one or more processors for accessing data and executing applications, and other components that facilitate communication over a network. The operations performed by one or more of the assistant input devices 106 and/or by the automated assistant 120 may be distributed across multiple computer systems. The automated assistant 120 may be implemented as, for example, computer programs running on one or more computers in one or more locations that are coupled to each other through a network (e.g., any of the networks 110 of FIG. 1).

As noted above, in various implementations, each of the assistant input devices 106 may operate a respective automated assistant client 118. In various embodiments, each automated assistant client 118 may include a respective speech capture/text-to-speech (TTS)/speech-to-text (STT) module $114_{1-N}$ (also referred to herein simply as "speech capture/TTS/STT module 114"). In other implementations, one or more aspects of the respective speech capture/TTS/STT module 114 may be implemented separately from the respective automated assistant client 118.

Each respective speech capture/TTS/STT module 114 may be configured to perform one or more functions including, for example: capture a user's speech (speech capture, e.g., via respective microphone(s) (which in some cases may comprise the presence sensor 105)); convert that captured audio to text and/or to other representations or embeddings (STT) using speech recognition model(s) stored in the ML model(s) database 192; and/or convert text to speech (TTS) using speech synthesis model(s) stored in the ML model(s) database 192. Instance(s) of these model(s) may be stored locally at each of the respective assistant input devices 106 and/or accessible by the assistant input devices (e.g., over the networks 110 of FIG. 1). In some implementations, because one or more of the assistant input devices 106 may be relatively constrained in terms of computing resources (e.g., processor cycles, memory, battery, etc.), the respective speech capture/TTS/STT module 114 that is local to each of the assistant input devices 106 may be configured to convert a finite number of different spoken phrases to text (or to other forms, such as lower dimensionality embeddings) using the speech recognition model(s). Other speech input may be sent to one or more of the cloud-based automated assistant components 119, which may include a cloud-based TTS module 116 and/or a cloud-based STT module 117.

Cloud-based STT module 117 may be configured to leverage the virtually limitless resources of the cloud to convert audio data captured by speech capture/TTS/STT module 114 into text (which may then be provided to natural language processor module 122) using speech recognition model(s) stored in the ML model(s) database 192. Cloud-based TTS module 116 may be configured to leverage the virtually limitless resources of the cloud to convert textual data (e.g., text formulated by automated assistant 120) into computer-generated speech output using speech synthesis model(s) stored in the ML model(s) database 192. In some implementations, the cloud-based TTS module 116 may provide the computer-generated speech output to one or more of the assistant devices to be output directly, e.g., using respective speaker(s) of the respective assistant devices. In other implementations, textual data (e.g., a client device notification included in a command) generated by the automated assistant 120 using the cloud-based TTS module 116 may be provided to speech capture/TTS/STT module 114 of the respective assistant devices, which may then locally convert the textual data into computer-generated speech using the speech synthesis model(s), and cause the computer-generated speech to be rendered via local speaker(s) of the respective assistant devices.

The automated assistant 120 (and in particular, the one or more cloud-based automated assistant components 119) may include a natural language processing (NLP) module 122, the aforementioned cloud-based TTS module 116, the aforementioned cloud-based STT module 117, and other components, some of which are described in more detail below. In some implementations, one or more of the engines and/or modules of automated assistant 120 may be omitted, combined, and/or implemented in a component that is separate from automated assistant 120. An instance of the NLP module 122 may additionally or alternatively be implemented locally at the assistant input devices 106.

In some implementations, the automated assistant 120 generates responsive content in response to various inputs generated by a user of one of the assistant input devices 106 during a human-to-computer dialog session with the automated assistant 120. The automated assistant 120 may provide the responsive content (e.g., over one or more of the networks 110 of FIG. 1 when separate from the assistant devices) for presentation to the user as part of the dialog session via the assistant input devices 106 and/or the assistant non-input devices 185. For example, the automated assistant 120 may generate responsive content in response to free-form natural language input provided via one of the assistant input devices 106. As used herein, free-form input is input that is formulated by a user and that is not constrained to a group of options presented for selection by the user.

The NLP module 122 of the automated assistant 120 processes natural language input generated by users via the assistant input devices 106 and may generate annotated output for use by one or more other components of the automated assistant 120, the assistant input devices 106, and/or the assistant non-input devices 185. For example, the NLP module 122 may process natural language free-form input that is generated by a user via one or more respective user interface input devices of the assistant input devices 106. The annotated output generated based on processing the natural language free-form input may include one or more annotations of the natural language input and optionally one or more (e.g., all) of the terms of the natural language input.

In some implementations, the NLP module 122 is configured to identify and annotate various types of grammatical information in natural language input. For example, the NLP module 122 may include a part of speech tagger configured to annotate terms with their grammatical roles. In some implementations, the NLP module 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities.

The entity tagger of the NLP module 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the NLP module 122 may additionally and/or alternatively include a coreference resolver (not depicted) configured to group, or "cluster," references to the same entity based on one or more contextual cues. For example, the coreference resolver may be utilized to resolve the term "it" to "front door lock" in the natural language input "lock it", based on "front door lock" being mentioned in a client device notification rendered immediately prior to receiving the natural language input "lock it".

In some implementations, one or more components of the NLP module 122 may rely on annotations from one or more other components of the NLP module 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the NLP module 122 may use related data outside of the particular natural language input to determine one or more annotations—such as an assistant input device notification rendered immediately prior to receiving the natural language input on which the assistant input device notification is based.

Although FIG. 1 is depicted as having a particular configuration of components implemented by the assistant devices and/or server(s), and is depicted having the assistant devices and/or server(s) communicating over particular networks, it should be understood that is for the sake of example and is not meant to be limiting. For example, the assistant input devices 106 and the assistant non-input devices may be directly communicatively coupled with each other over one or more networks (not depicted). As another example, operations of the one or more cloud-based automated assistant components 119 can be implemented locally at one or more of the assistant input devices 106 and/or one or more of the assistant non-input devices. As yet another example, instance(s) of various ML models stored in the ML model(s) database 192 may be stored locally at the assistant devices, and/or instance(s) of a device topology representation of an ecosystem stored in the device topology database 193 may be stored locally at the assistant input devices. Further, in implementations where data (e.g., device activity, audio data or recognized text corresponding thereto, device topology representations, and/or any other data described herein) is transmitted over any of the one or more networks 110 of FIG. 1, the data can be encrypted, filtered, or otherwise protected in any manner to ensure privacy of user(s).

By using the techniques described herein to infer and assign semantic labels to the assistant devices in the ecosystem, the device topology representation of the ecosystem can be maintained up-to-date. Further, the semantic labels that are assigned to the assistant devices are semantically meaningful for the user in that the semantic labels assigned to the respective assistant devices are selected based on the usage of the respective assistant devices and/or respective portions of the ecosystem in which the respective assistant devices are located. Accordingly, when spoken utterances are received at one or more of the assistant devices in the ecosystem, an automated assistant can more accurately select one or more of the assistant devices that are best suited for satisfying the spoken utterance. As a result, a quantity of user inputs that are received by the one or more of the assistant devices in the ecosystem can be reduced because the user associated with the ecosystem need not specify particular devices to satisfy the spoken utterance or repeat the spoken utterance if an incorrect device is selected to satisfy the spoken utterance, thereby conserving computational resources at the assistant devices and/or network resources by reducing network traffic. Further, the quantity of user inputs that are received by the one or more of the assistant devices in the ecosystem can be reduced because the user need not manually update the device topology representation via a software application associated with the ecosystem when an assistant device is newly added to the ecosystem or moved locations within the ecosystem.

Figure 2A:
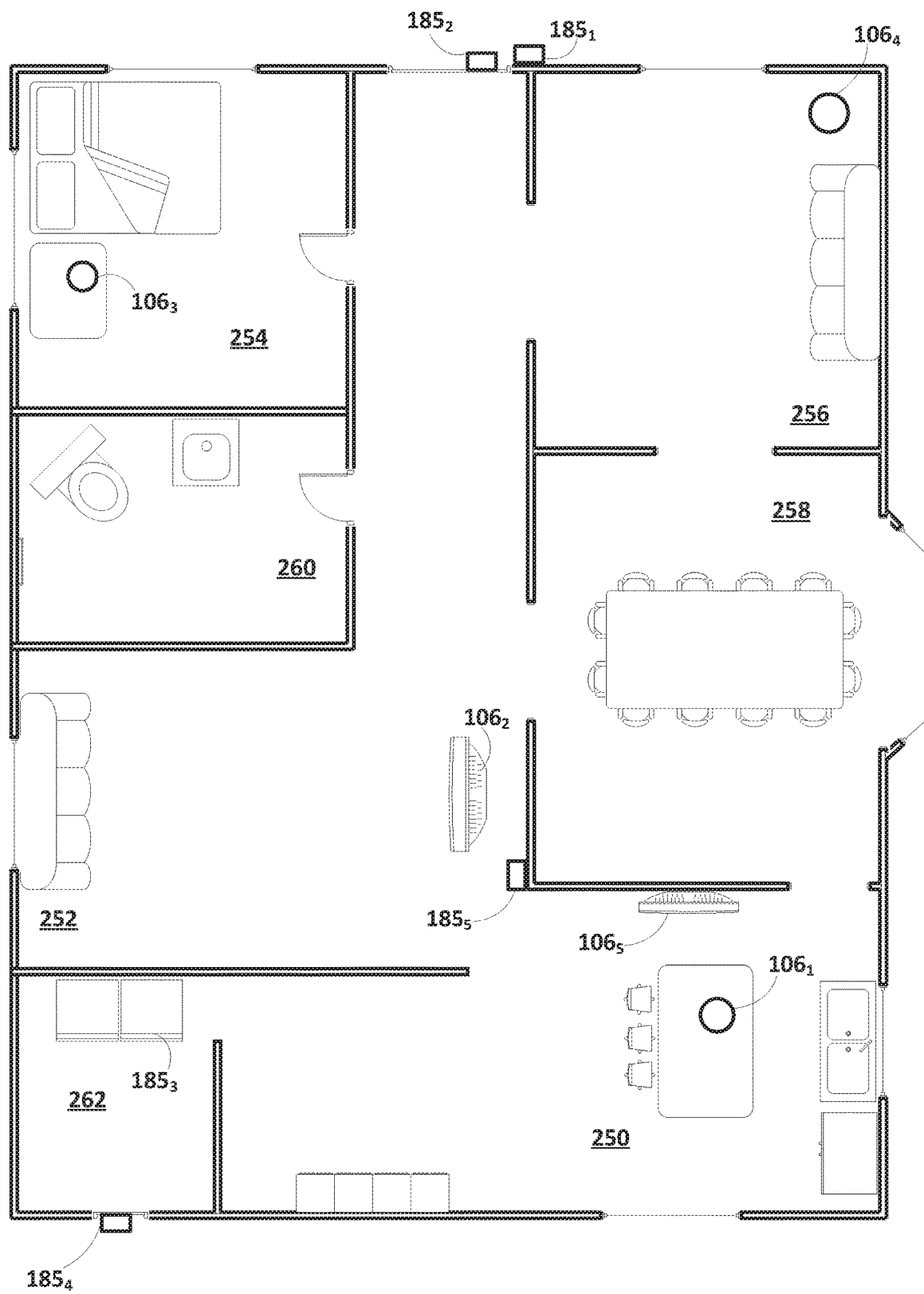
FIGS. 2A and 2B depict some examples associated with assigning a given semantic label to a given assistant device that is newly added to an ecosystem of assistant devices and/or that is moved within the ecosystem of assistant devices, in accordance with various implementations.
Figure 2B:
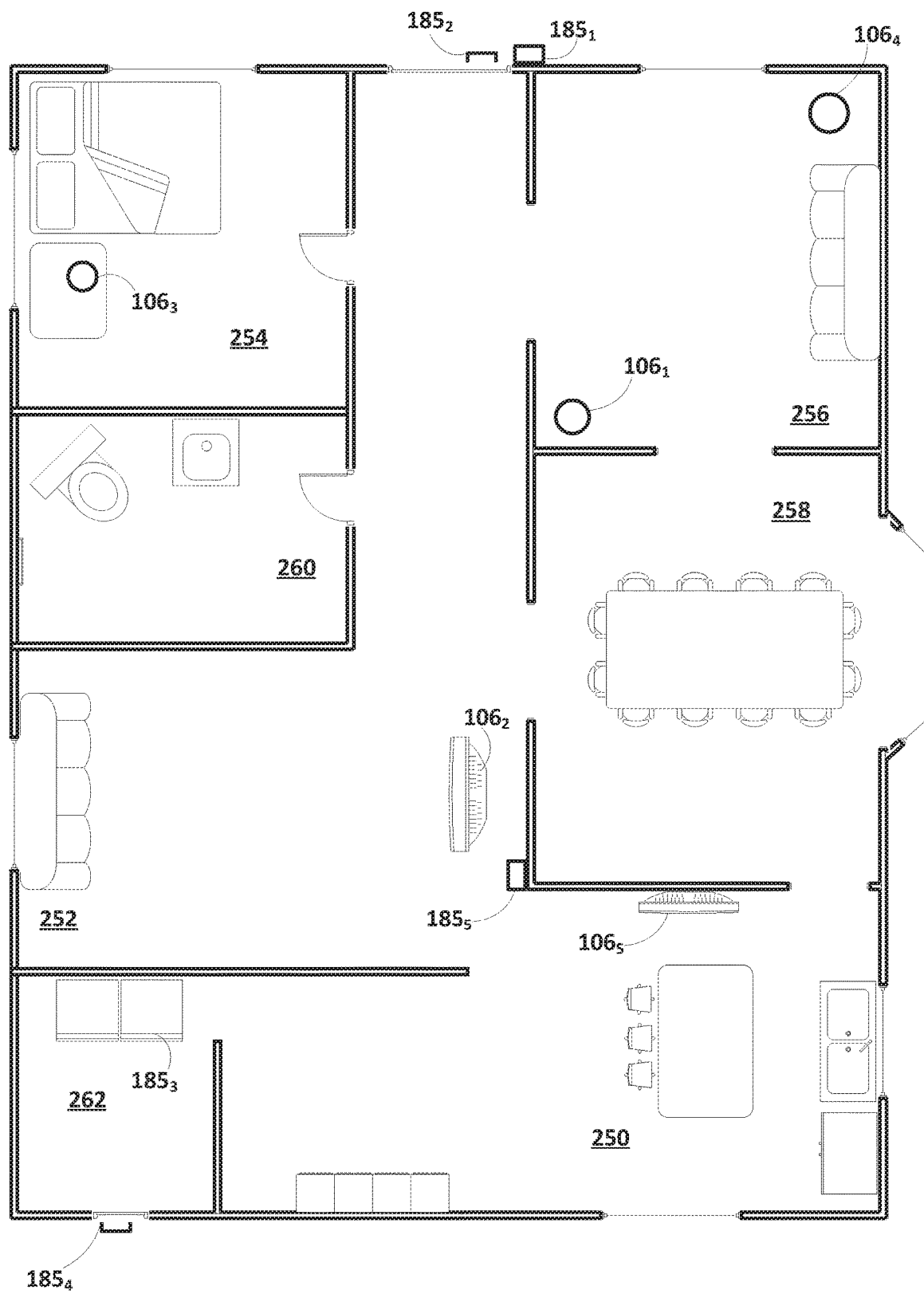

Additional description of various components of FIG. 1 is now provided with reference to FIGS. 2A and 2B. A home floorplan is depicted in FIGS. 2A and 2B. The depicted floorplan includes a plurality of rooms, 250-262. A plurality of assistant input devices $106_{1-5}$ are deployed throughout at least some of the rooms. Each of the assistant input devices $106_{1-5}$ may implement an instance of automated assistant client 118 configured with selected aspects of the present disclosure and may include one or more input devices, such as microphone(s) that are capable of capturing utterances spoken by a person nearby. For example, a first assistant input device $106_1$ taking the form of an interactive standalone speaker and display device (e.g., display screen, projector, etc.) is deployed in room 250 in FIG. 2A, which in this example is a kitchen, and in room 256 in FIG. 2B, which in this example is a living room. A second assistant input device $106_2$ taking the form of a so-called "smart" television (e.g., a networked television with one or more processors that implement a respective instance of the automated assistant client 118) is deployed in room 252, which in this example is a den. A third assistant input device $106_3$ taking the form of an interactive standalone speaker without a display is deployed in room 254, which in this example is a bedroom. A fourth assistant input device $106_4$ taking the form of another interactive standalone speaker is deployed in room 256, which in this example is a living room. A fifth assistant input device $106_5$ also taking the form of a smart television is also deployed in room 250, which in this example is a kitchen.

While not depicted in FIGS. 2A and 2B, the plurality of assistant input devices $106_{1-4}$ may be communicatively coupled with each other and/or other resources (e.g., the Internet) via one or more wired or wireless WANs and/or LANs (e.g., via the networks 110 of FIG. 1). Additionally, other assistant input devices—particularly mobile devices such as smart phones, tablets, laptops, wearable devices, etc.—may also be present, e.g., carried by one or more persons in the home and may or may not also be connected to the same WANs and/or LANs. It should be understood that the configuration of assistant input devices depicted in FIGS. 2A and 2B is just one example; more or fewer and/or different assistant input devices 106 may be deployed across any number of other rooms and/or areas of the home, and/or in locations other than a residential home (e.g., a business, a hotel, a public place, a vehicle, and/or other locations or spaces).

Further depicted in FIGS. 2A and 2B are a plurality of assistant non-input devices $185_{1-5}$. For example, a first assistant non-input device $185_1$ taking the form of a smart doorbell is deployed on the exterior of the home near a front door of the home. A second assistant non-input device $185_2$ taking the form of a smart lock is deployed on the exterior of the home on the front door of the home. A third assistant non-input device $185_3$ taking the form of a smart clothes washer is deployed in room 262, which in this example is a laundry room. A fourth assistant non-input device $185_4$ taking the form of a door open/close sensor is deployed near a rear door in room 262, and detects whether the rear door is open or closed. A fifth assistant non-input device $185_5$ taking the form of a smart thermostat is deployed in room 252, which in this example is a den.

Each of the assistant non-input devices 185 can communicate (e.g., via the networks 110 of FIG. 1) with a respective assistant non-input system 180 (shown in FIG. 1) to provide data to the respective assistant non-input system 180 and optionally to be controlled based on commands provided by the respective assistant non-input system 180. One or more of the assistant non-input devices 185 can additionally or alternatively communicate (e.g., via the networks 110 of FIG. 1) directly with one or more of the assistant input devices 106 to provide data to one or more of the assistant input devices 106 and optionally to be controlled based on commands provided by one or more of the assistant input devices 106. It should be understood that the configuration of assistant non-input devices 185 depicted in FIGS. 2A and 2B is just one example; more or fewer and/or different assistant non-input devices 185 may be deployed across any number of other rooms and/or areas of the home, and/or in locations other than a residential home (e.g., a business, a hotel, a public place, an airport, a vehicle, and/or other locations or spaces).

In various implementations, a semantic label can be assigned to a given assistant device (e.g., a given one of the assistant input devices 106 or the assistant non-input devices 185) based on processing of one or more device-specific signals that are associated with the respective assistant devices. The one or more device-specific signals can be detected by the given assistant device and/or generated by the given assistant device. The one or more device-specific signals can include, for example, one or more queries previously received at the given assistant device (if any), one or more commands previously executed at the given assistant device (if any), instances of ambient noise previously detected at the given assistant device (and optionally only when speech reception was active at the given assistant device), unique identifier(s) (or label(s)) for respective assistant device(s) that are locationally proximate to the given assistant device, and/or user preferences of user(s) associated with the ecosystem. Each of the one or more device-specific signals associated with the given assistant device can be processed to classify each of them into one or more semantic categories from among a plurality of disparate semantic categories.

Further, one or more candidate semantic labels can be generated based on the one or more device-specific signals. The candidate semantic labels can be generated using one or more rule(s) (that are optionally heuristically defined) or machine learning model(s) (e.g., stored in the ML model(s) database 192). For example, one or more heuristically defined rules may indicate that a candidate semantic label associated with each of the semantic categories, into which the one or more device-specific signals, should be generated. For instance, assume the device-specific signals are classified into a "kitchen" category, a "cooking" category, a "bedroom" category, and a "living room" category. In this example, the candidate semantic labels can include a first candidate semantic label of "kitchen assistant device", a second candidate semantic label of "cooking assistant device", a third candidate semantic label of "bedroom assistant device", and a fourth semantic label of "living room assistant device". As another example, the one or more device-specific signals (or the one or more semantic categories corresponding thereto) can be processed using a machine learning model that is trained to generate the candidate semantic labels. For instance, the machine learning model can be trained based on a plurality of training instances. Each of the training instances can include training instance input and corresponding training instance output. The training instance input can include, for example, one or more device-specific signals and/or one or more semantic categories, and the corresponding training instance output can include, for example, ground truth output corresponding to the semantic labels that should be assigned based on the training instance input.

Moreover, the semantic label that is assigned to the given assistant device can be selected from among the one or more candidate semantic labels. The semantic label that is to be assigned to the given assistant device can be selected from among the one or more candidate semantic labels based on a confidence level associated with each of the one or more candidate semantic labels. In some implementations, the semantic label that is assigned to the given assistant device can be automatically assigned to the given assistant device, whereas in additional or alternative implementations the user associated with the ecosystem of FIGS. 2A and 2B may be prompted to select the semantic label to be assigned to the given assistant device from among a list of the one or more candidate semantic labels (e.g., as described with respect to FIG. 3). In some additional or alternative implementations, the semantic label can be automatically assigned to the given assistant device if the given semantic label is unique (relative to the other assistant devices that are locationally proximate to the given assistant device in the ecosystem).

In some versions of those implementations, the given assistant device, to which the semantic label is to be assigned, can be identified in response to determining that the given assistant device is newly added to the ecosystem (e.g., via the event detection engine 130 and/or the device identification engine 140 of FIG. 1) For example, and referring specifically to FIG. 2A, assume that the first assistant input device $106_1$ taking the form of the interactive standalone speaker and device is newly deployed in room 250, which in this example is the kitchen. With respect to the one or more device-specific signals that are associated with the first assistant input device $106_1$ in FIG. 2A, assume that no previous queries or commands have been received at the first assistant input device $106_1$ or executed by the first assistant input device $106_1$ (aside from configuring the first assistant input device $106_1$) since the first assistant input device $106_1$ has been newly added to the ecosystem, assume several instances of ambient noise have been captured while the first assistant input device $106_1$ is being configured by the user of the ecosystem (e.g., when speech reception is active as the user provides spoken utterances including, for example, a name, test utterances to establish a speech embedding for the user, etc.), assume respective unique identifiers (or labels) associated with the fifth assistant input device $106_5$, taking the form of the smart television in the room 250 (e.g. "kitchen TV"), and the fifth assistant non-input device $185_5$, taking the form of the smart thermostat in the room 252 (e.g., "thermostat") are detected at the first assistant input device $106_1$, and assume user preferences of the user associated with the ecosystem are known.

In this example, the instances of the ambient noise (if any) can be processed, using ambient noise detection model(s), to classify the ambient noise into one or more semantic categories. For instance, assume instances of the ambient noise capture water dripping in the sink in room 250, a microwave or oven sounding in room 250, food sizzling on a skillet on a stovetop in room 250, etc. These instances of ambient noise can be classified into a "kitchen" semantic category, a "cooking" semantic category, and/or other semantic categories related to noises that are typically encountered in a kitchen. Additionally or alternatively, the ambient noise may capture a movie, a television show, or an advertisement being visually and/or audibly rendered via the fifth assistant input device $106_5$, taking the form of the smart television in the room 250. These instances of ambient noise can be classified into a "television" semantic category, a "movie" semantic category, and/or other semantic categories related to noises that are typically encountered from smart televisions. Additionally or alternatively, the unique identifier(s) (or label(s)) of the fifth assistant input device $106_5$ (e.g., the "kitchen TV") and the fifth assistant non-input device $185_5$ (the "thermostat") can be processed to generate one or more of the semantic labels. These unique identifier(s) (or label(s)) can be classified into a "kitchen" semantic category, a "smart device" semantic category, and/or other semantic categories related to the assistant devices that are locationally proximate to the first assistant input device $106_1$ in the ecosystem of FIG. 2A. Additionally or alternatively, assume the user preferences indicate that the user is interested in cooking and a fictitious chef named Johnny Flay. These user preferences can be identified as being related to the first assistant input device 1061 based on one or more of the other device-specific signals being classified into the "cooking" category or "kitchen" category, and the user preferences of cooking and Johnny Flay also being classified into the "cooking" category or "kitchen" category. As a result, the candidate semantic labels in this example can include "kitchen speaker device", "cooking speaker device", "television speaker device", "movie speaker device", "Johnny Flay device", and/or other candidate semantic labels based on the one or more device-specific labels that are associated with the first assistant input device $106_1$. Further, in this example, a given semantic label, from among the semantic labels, can be automatically assigned to the first assistant input device $106_1$, or the user associated with the ecosystem can be prompted to select one or more of the candidate semantic labels to assign the given semantic label to the first assistant input device $106_1$ (e.g., while the first assistant input device $106_1$ is being configured).

In some additional or alternative implementation, the given assistant device, to which the semantic label is to be assigned, can be identified periodically (e.g., every week, every month, every six months, and/or any other period of time via the event detection engine 130 and/or the device identification engine 140 of FIG. 1) For example, and referring specifically to FIG. 2A, assume that the first assistant input device $106_1$ taking the form of the interactive standalone speaker and display device has been deployed in room 250, which in this example is the kitchen, for six months. With respect to the one or more device-specific signals that are associated with the first assistant input device $106_1$ in FIG. 2A, assume that previous queries or commands have been received at the first assistant input device $106_1$ or executed by the first assistant input device $106_1$, assume instances of ambient noise have been captured while the first assistant input device $106_1$, and assume respective unique identifiers (or labels) associated with the fifth assistant input device $106_5$, taking the form of the smart television in the room 250 (e.g. "kitchen TV"), and the fifth assistant non-input device $185_5$, taking the form of the smart thermostat in the room 252 (e.g., "thermostat") are still detected at the first assistant input device $106_1$.

In this example, the queries and commands (or text corresponding thereto) can be processed, using semantic classifier(s), to classify the queries and commands into one or more semantic categories. For instance, the queries and commands previously received at the first assistant input device $106_1$ can include queries related to requesting cooking recipes, commands related to setting timers, commands related to controlling any smart devices in the kitchen, and/or other queries or commands. These instances of queries and commands can be classified into a "cooking" semantic category, a "controlling smart device" category, and/or other semantic categories based on the queries and commands that are received at the first assistant input device $106_1$. The candidate semantic labels can additionally or alternatively be determined based on the instances of the ambient noise and/or the unique identifier(s) (or label(s)) that are locationally proximate to the first assistant input device $106_1$ as described above. As a result, the candidate semantic labels in this example can include "kitchen device", "timer device", "thermostat display device", "cooking display device", "television device", "movie device", "Johnny Flay recipe device", and/or other candidate semantic labels based on the one or more device-specific labels that are associated with the first assistant input device $106_1$. Further, in this example, a given semantic label, from among the semantic labels, can be automatically assigned to the first assistant input device $106_1$, or the user associated with the ecosystem can be prompted to select one or more of the candidate semantic labels to assign the given semantic label to the first assistant input device $106_1$ (e.g., while the first assistant input device $106_1$ is being configured).

In some additional or alternative implementations, the given assistant device, to which the semantic label is to be assigned, can be identified in response to determining that the given assistant device has moved locations within the ecosystem (e.g., via the event detection engine 130 and/or the device identification engine 140 of FIG. 1) For example, and referring specifically now to FIG. 2B, assume that the first assistant input device $106_1$ taking the form of the interactive standalone speaker and display device is moved from room 250, which in this example is the kitchen, to room 256, which in this example is the living room. With respect to the one or more device-specific signals that are associated with the first assistant input device $106_1$ in FIG. 2B, assume that previous queries or commands have been received at the first assistant input device $106_1$ or executed by the first assistant input device $106_1$, assume several instances of ambient noise have been captured, and assume respective unique identifiers (or labels) associated with the fourth assistant input device $106_4$, taking the form of another interactive standalone speaker in the room 256 (e.g. "living room speaker device") is detected at the first assistant input device $106_1$, and assume user preferences of the user associated with the ecosystem are known. In this example, the one or more device-specific signals may be limited to those that are generated or received subsequent to the first assistant input device $106_1$ being moved locations within the ecosystem (less the user preferences).

In this example, the queries and commands (or text corresponding thereto) can be processed, using semantic classifier(s), to classify the queries and commands into one or more semantic categories. For instance, the queries and commands previously received at the first assistant input device $106_1$ can include queries related to requesting weather or traffic information, commands related to planning a vacation, and/or other queries or commands. These instances of queries and commands can be classified into an "information" semantic category (or more particularly a "weather information" category and a "traffic information" category), a "planning" category, and/or other semantic categories based on the queries and commands that are received at the first assistant input device $106_1$. Additionally or alternatively, the instances of the ambient noise can be processed, using ambient noise detection model(s), to classify the ambient noise into one or more semantic categories. For instance, the ambient noise may capture music or a podcast being audibly rendered by the fourth assistant input device $106_4$, humans conversing on the couch depicted in room 256, a movie or television show being audibly rendered by a computing device in the ecosystem, etc. These instances of ambient noise can be classified into a "music" semantic category, a "conversation" semantic category, a "movies" semantic category, a "television show" semantic category, and/or other semantic categories related to noises that are typically encountered in a kitchen. Additionally or alternatively, the unique identifier(s) (or label(s)) of the fourth assistant input device $106_4$ (e.g., the "living room speaker device") can be processed to generate one or more of the semantic labels. This unique identifier(s) (or label(s)) can be classified, for example, into a "living room" semantic category and/or other semantic categories related to the assistant devices that are locationally proximate to the first assistant input device $106_1$ in the ecosystem of FIG. 2B. Additionally or alternatively, assume the user preferences indicate that the user is interested in cooking and a fictitious movie titled Vehicles and a specific character in the movie named Thunder McKing. These user preferences can be identified as being related to the first assistant input device 1061 based on one or more of the other device-specific signals being classified into the "movie", and the user preferences of the movie Vehicles and Thunder McKing also being classified into the "movies" category. As a result, the candidate semantic labels in this example can include "living room device", "planning device", "Vehicles device", "Thunder McKing device", and/or other candidate semantic labels based on the one or more device-specific labels that are associated with the first assistant input device $106_1$. Further, in this example, a given semantic label, from among the semantic labels, can be automatically assigned to the first assistant input device $106_1$, or the user associated with the ecosystem can be prompted to select one or more of the candidate semantic labels to assign the given semantic label to the first assistant input device $106_1$.

In some additional or alternative implementations, the given assistant device, to which the semantic label is to be assigned, can be identified in response to determining that the portion of the ecosystem in which the given assistant device is located has been repurposed (e.g., via the event detection engine 130 and/or the device identification engine 140 of FIG. 1) For example, and referring specifically now to FIG. 2B, assume that the first assistant input device $106_1$ taking the form of the interactive standalone speaker and display device is located in room 256, which in this example is the living room, but the living room is repurposed into a bedroom. With respect to the one or more device-specific signals that are associated with the first assistant input device 106₁ in FIG. 2B, assume that previous queries or commands have been received at the first assistant input device 106₁ or executed by the first assistant input device 106₁, assume several instances of ambient noise have been captured, and assume respective unique identifiers (or labels) associated with the fourth assistant input device 106₄, taking the form of another interactive standalone speaker in the room 256 (e.g. "living room speaker device") is detected at the first assistant input device 106₁. In this example, the one or more device-specific signals may be limited to those that are generated or received subsequent to room 256 being repurposed.

In this example, the queries and commands (or text corresponding thereto) can be processed, using semantic classifier(s), to classify the queries and commands into one or more semantic categories. For instance, the queries and commands previously received at the first assistant input device 106₁ can include commands related to setting alarms, commands related to a good morning or good night routine, and/or other queries or commands. These instances of commands can be classified into an "alarm" semantic category, a "routine" category (or more particularly a "morning routine" category or a "night routine" category, and/or other semantic categories based on the queries and commands that are received at the first assistant input device 106₁. Additionally or alternatively, the instances of the ambient noise can be processed, using ambient noise detection model(s), to classify the ambient noise into one or more semantic categories. For instance, the ambient noise may capture snoring of one or more users, humans conversing, etc. These instances of ambient noise can be classified into a "bedroom" semantic category, a "conversation" semantic category, and/or other semantic categories related to noises that are typically encountered in a bedroom. Additionally or alternatively, the unique identifier(s) (or label(s)) of the fourth assistant input device 106₄ (e.g., the "living room speaker device") can be processed to generate one or more of the semantic labels. This unique identifier(s) (or label(s)) can be classified, for example, into a "living room" semantic category and/or other semantic categories related to the assistant devices that are locationally proximate to the first assistant input device 106₁ in the ecosystem of FIG. 2B. As a result, the candidate semantic labels in this example can include "living room display device", "bedroom display device", and/or other candidate semantic labels based on the one or more device-specific labels that are associated with the first assistant input device 106₁. Further, in this example, a given semantic label, from among the semantic labels, can be automatically assigned to the first assistant input device 106₁, or the user associated with the ecosystem can be prompted to select one or more of the candidate semantic labels to assign the given semantic label to the first assistant input device 106₁. Notably, in this example, the system may determine the given semantic label corresponds to "bedroom display device", even though the unique identifier(s) (or label(s)) for the fourth assistant input device 106₄ correspond to a "living room" category, since the usage of the first assistant input device 106₁ indicates that it is located in a bedroom.

Although FIGS. 2A and 2B are described herein with respect to the given assistant device, to which the semantic label is assigned, being an assistant input device (e.g., the first assistant input device 106₁), it should be understood that is for the sake of example and is not meant to be limiting. For example, the techniques described herein can also be utilized to assign respective semantic label to assistant non-input devices 185. For instance, assume a smart light (presumably an assistant non-input device without any microphone(s)) is newly added to room 252, which in this example is the bedroom. In this example, a unique identifier or label associated with the third assistant input device 106₃ taking the form of an interactive standalone speaker without a display (e.g., "bedroom speaker device") can be utilize to infer a semantic label of "bedroom smart light" for the newly added smart light using the techniques described here. Further, assume the smart light is moved from room 254 to room 262, which in this example is a laundry room. In this example, a unique identifier or label associated with the third assistant non-input device 185₃ taking the form of a smart clothes washer can be utilized to infer a semantic label of "laundry room smart light" for the recently moved smart light using the techniques described here.

Figure 3:
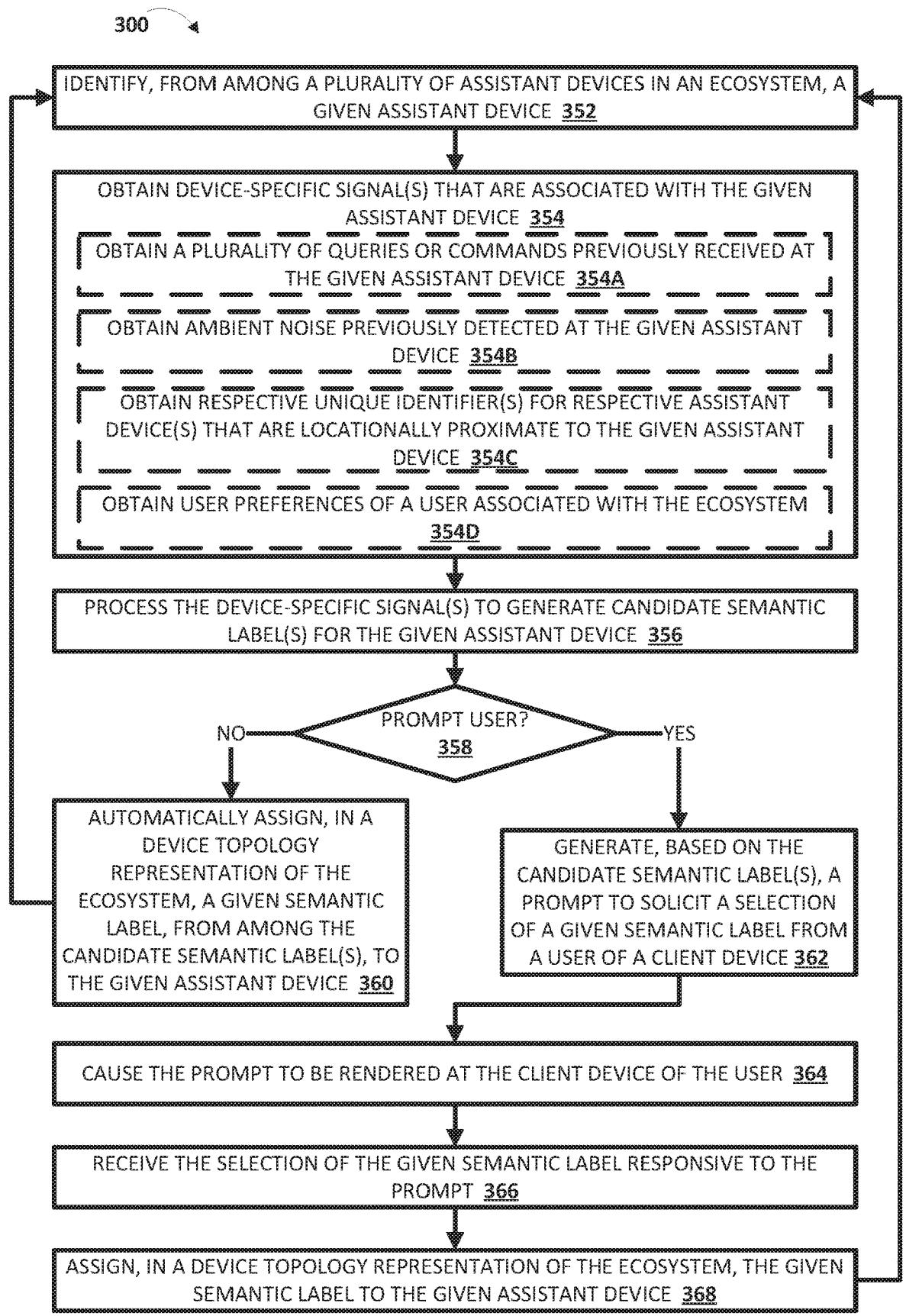
FIG. 3 is a flowchart illustrating an example method of assigning a given semantic label to a given assistant device in an ecosystem, in accordance with various implementations.

Turning now to FIG. 3, a flowchart illustrating an example method 300 of assigning a given semantic label to a given assistant device in an ecosystem is depicted. For convenience, the operations of the method 300 is described with reference to a system that performs the operations. The system of the method 300 includes one or more processors and/or other component(s) of a computing device. For example, the system of the method 300 can be implemented by an assistant input device 106 of FIG. 1, 2A, or 2B, an assistant non-input device 185 of FIG. 1, 2A, or 2B, computing device 510 of FIG. 5, one or more servers, other computing devices, and/or any combination thereof. Moreover, while operations of the method 300 are shown in a particular order, this is not meant to be limiting. One or more operations may be reordered, omitted, and/or added.

At block 352, the system identifies, from among a plurality of assistant devices in an ecosystem, a given assistant device. The given assistant device can be an assistant input device (e.g., one of the assistant input devices 106 of FIG. 1) or an assistant non-input device (e.g., one of the assistant non-input devices 185 of FIG. 1). In some implementations, the given assistant device can be identified in response to determining that is newly added to the ecosystem, whereas in other implementations the given assistant device can be identified in response to determining that has moved locations within the ecosystem (e.g., described with respect to the event detection engine 130 of FIG. 1). In some additional or alternative implementations, the given assistant device can be identified on a periodic basis (e.g., once a month, once every six months, once a year and so on).

At block 354, the system obtains device-specific signal(s) that are associated with the given assistant device. The device-specific signal(s) can be detected by the given assistant device and/or generated by the given assistant device. In some implementations, block 354 can include one or more of optional sub-block 354A, sub-block 354B, sub-block 354C, or sub-block 354D. If included, at sub-block 354A, the system obtains a plurality of queries or commands previously received at the given assistant device (if any). If included, at sub-block 354B, the system additionally or alternatively obtains instances of ambient noise previously detected at the given assistant device (and optionally only when speech reception was active at the given assistant device (e.g., subsequent to receiving a particular word or phrase that invokes an automated assistant) or via a digital signal processor (DSP) when speech reception is not active). In some implementations, the ambient noise obtained is restricted to ambient noise that is detected when speech reception is active at the given assistant device. If included, at sub-block 354C, the system additionally or alternatively obtains unique identifier(s) (or label(s)) for respective assistant device(s) that are locationally proximate to the given assistant device (e.g., determined using the device identification engine 140 of FIG. 1). If included, at sub-block 354D, the system additionally or alternatively obtains user preferences of a user associated with the ecosystem.

At block 356, the system processes the device-specific signal(s) to generate candidate semantic label(s) for the given assistant device. In implementations where the one or more device-specific signals include plurality of queries or commands previously received at the given assistant device, the plurality of queries or commands (or text corresponding thereto) can be processed, using semantic classifier(s), to classify each of the plurality of queries of commands into one or more disparate semantic categories. For example, queries that are related cooking recipes and commands that are related to controlling a smart oven or a smart coffee maker in a kitchen can be classified into a cooking category or a kitchen category, queries that are related to weather can be classified into a weather category, commands that are related to controlling lights can be classified into a lights category, and so on. In implementations where the one or more device-specific signals additionally or alternatively include instances of ambient noise detected at the given assistant device, the instances of the ambient noise can be processed, using ambient noise detection model(s), to classify each of the instances of the ambient noise into one or more disparate semantic categories. For example, if an instance of the ambient noise is determined to correspond to a microwave sounding, food sizzling on a skillet, a food processor processing food, etc., then the instance of the ambient noise can be classified into a cooking category. As another example, if an instance of the ambient noise is determined to correspond to a saw buzzing, a hammer hammering, etc., then the instance of the ambient noise can be classified into a garage category and a workshop category. In implementations where the one or more device-specific signals additionally or alternatively include unique identifier(s) (or label(s)) for respective assistant device(s) that are locationally proximate to the given assistant device, the unique identifier(s) (or label(s)) for the respective assistant device(s) can be classified into one or more disparate semantic categories. For example, if the unique identifier(s) (or label(s)) for the respective assistant device(s) correspond to "coffee maker", "oven", "microwave", then the unique identifier(s) can be classified into a kitchen category or a cooking category. As another example, if the unique identifier(s) (or label(s)) for the respective assistant device(s) correspond to "bedroom lights" and "bedroom casting device", then the unique identifier(s) can be classified into a bedroom category. In implementations where the one or more device-specific signals additionally or alternatively include user preferences of a user associated with the ecosystem, the user preferences can be classified into one or more disparate semantic categories. For example, if the user preferences indicate that the user is interested in cooking, cooking shows, specific chefs, and/or other cooking-related interests, then the user preferences can be classified into a kitchen category, a cooking category, or a category associated with the specific chef.

The candidate semantic label(s) can be generated based on the processing of the one or more device-specific signals. For example, assume the one or more device-specific signals indicate that the given assistant device is located in a kitchen or living room in a primary house of the user associated with the ecosystem. Further assume that the given assistant device is an interactive standalone speaker device having a display. In this example, a first candidate semantic label of "kitchen display device" and a second candidate semantic label of "living room display device" can be generated. Generating the candidate semantic label(s) based on the one or more device-specific signals is described in greater detail herein (e.g., with respect to FIGS. 2A and 2B).

At block 358, the system determines whether to prompt a user that is associated with the ecosystem to solicit a selection of a given semantic label from among the candidate semantic label(s). The system can determine whether to prompt the user to solicit the selection of the given semantic label based on whether respective confidence level(s) associated with the candidate semantic label(s) satisfy a threshold confidence level. The respective confidence level(s) can be determined based on, for example, a quantity of the one or more device-specific signals that are classified into a given semantic category. For example, assume that the given assistant device identified at block 352 is an interactive standalone speaker that implements an instance of an automated assistant. Further assume that each of the one or more device-specific signals indicate that the interactive standalone speaker is located in a bedroom. For instance, based on prior queries or commands received at the interactive standalone speaker being associated with setting alarms or good night routine, based on instances of ambient noise that include snoring, and/or based on other assistant devices having unique identifier(s) (or label(s)) of "bedroom lights" and "bedroom casting device". In this example, the system may be highly confident in a semantic label of "bedroom speaker device" since the interactive standalone speaker is associated with a bedroom in a primary house of the user associated with the ecosystem. However, if some of the queries or commands received at the interactive standalone speaker are associated with cooking recipes, then the system may not be as confident in the semantic label of "bedroom speaker device".

If, at an iteration of block 358, the system determines not to prompt the user to solicit the selection of the given semantic label, then the system may proceed to block 360. At block 360, the system automatically assigns, in a device topology representation in the ecosystem, a given semantic label, from among the candidate semantic label(s), to the given assistant device. The device topology representation of the ecosystem can be stored locally at one or more of the assistant devices in the ecosystem and/or at a remote system in communication with one or more of the assistant devices in the ecosystem. In some implementations, the given semantic label may be the only semantic label associated with the given assistant device (and optionally supplant other unique identifier(s) or label(s) assigned to the given assistant device), whereas in other implementations the given semantic label can be added to a list of unique identifier(s) or label(s) assigned to the given assistant device. The system may then return to block 352 to identify an additional given assistant device from among the plurality of assistant devices in the ecosystem to generate and assign an additional given semantic label to the additional given assistant device.

If, at an iteration of block 358, the system determines to prompt the user to solicit the selection of the given semantic label, then the system may proceed to block 362. At block 362, the system generates, based on the candidate semantic label(s), a prompt to solicit a selection of a given semantic label from a user of a client device. At block 364, the system causes the prompt to be rendered at the client device of the user. The prompt can be rendered visually and/or audibly at the client device of the user, and can optionally be based on capabilities of the client device at which the prompt is rendered. For example, the prompt may be rendered via a software application that is accessible at the client device (e.g., a software application that is associated with the ecosystem or one or more of the assistant devices included in the ecosystem). In this example, if the client device includes a display, then the prompt may be rendered visually via the software application (or a home screen of the client device), and/or audibly via speaker(s) of the client device. However, if the client device does not include a display, then the prompt may only be rendered audibly via the speaker(s) of the client device. At block 366, the system receives the selection of the given semantic label responsive to the prompt. The client device of the user can be, for example, the given assistant identified at block 352 or a distinct client device (e.g., a mobile device of the user, or any other assistant device in the ecosystem capable of rendering the prompt). For example, assume the system generated candidate semantic labels of "bedroom speaker device" and "kitchen speaker device". In this example, the system can generate a prompt that includes selectable elements associated with both of these semantic labels, and request that the user provide input (e.g., touch or spoken) to select one of the candidate semantic labels to assign to the given assistant device as the given semantic label to be assigned to the given assistant device. At block 368, the system assigns, in a device topology representation of the ecosystem, the given semantic label to the given assistant device in a similar manner described above with respect to block 360.

Figure 4:
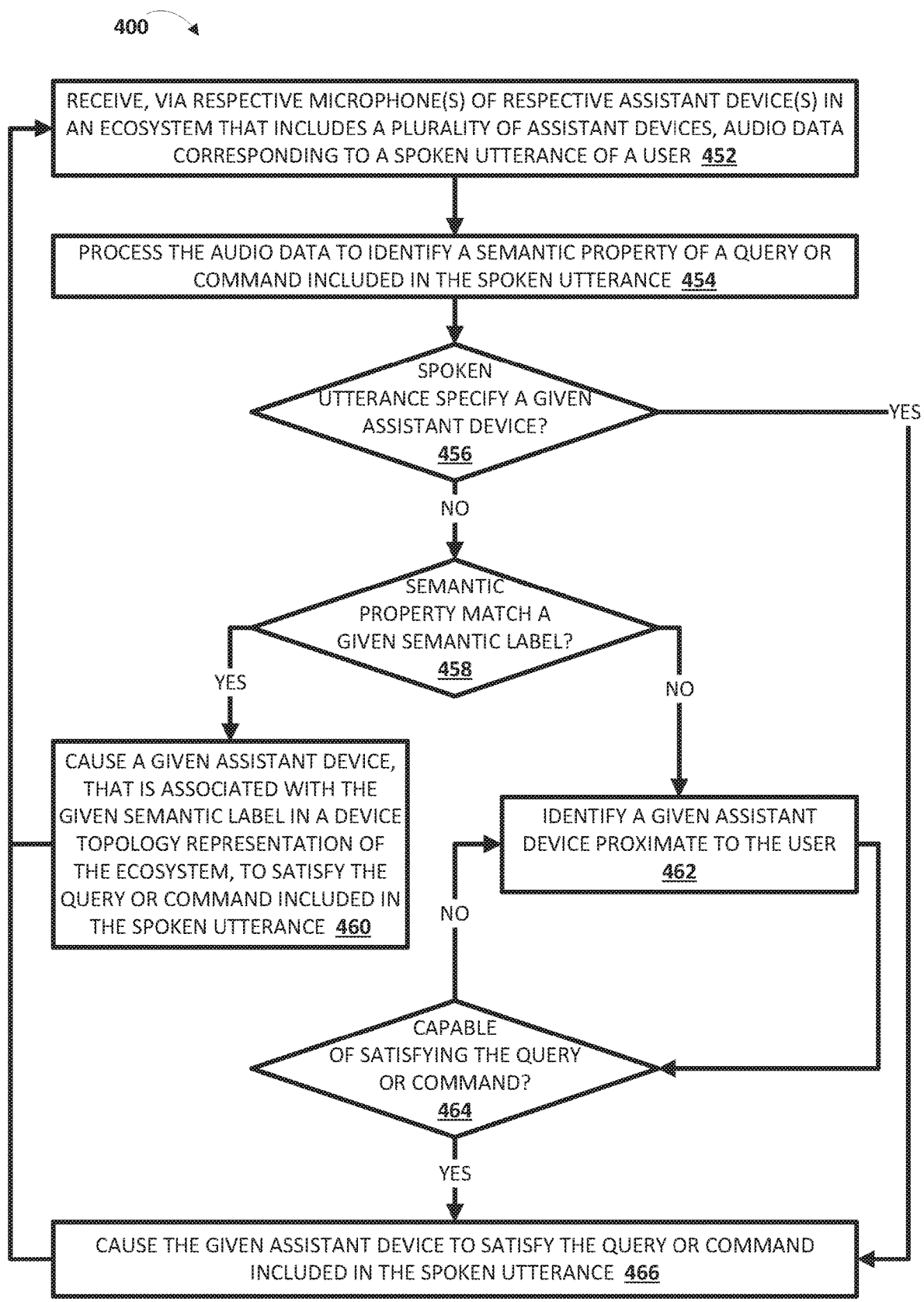
FIG. 4 is a flowchart illustrating an example method of using assigned semantic labels in satisfying a query or command received at assistant device(s) in an ecosystem, in accordance with various implementations.

Turning now to FIG. 4, a flowchart illustrating an example method 400 of using assigned semantic labels in satisfying a query or command received at assistant device(s) in an ecosystem is depicted. For convenience, the operations of the method 400 is described with reference to a system that performs the operations. The system of the method 400 includes one or more processors and/or other component(s) of a computing device. For example, the system of the method 400 can be implemented by an assistant input device 106 of FIG. 1, 2A, or 2B, an assistant non-input device 185 of FIG. 1, 2A, or 2B, computing device 510 of FIG. 5, one or more servers, other computing devices, and/or any combination thereof. Moreover, while operations of the method 400 are shown in a particular order, this is not meant to be limiting. One or more operations may be reordered, omitted, and/or added.

At block 452, the system receives, via respective microphone(s) of respective assistant device(s) in an ecosystem that includes a plurality of assistant devices, audio data corresponding to a spoken utterance of a user. The user may be associated with the ecosystem.

At block 454, the system processes the audio data to identify a semantic property of a query or command included in the spoken utterance. The semantic property of the query or command may correspond to a linguistic unit, such as a word or phrase, that defines a related field or related set of words and/or phrases. In some implementations, the system can process the audio data, using speech recognition model(s), to convert the spoken utterance captured in the audio data into text, and can identify, using semantic classifier(s), the semantic property based on the recognized text. In additional or alternative implementations, the system can process the audio data, using semantic classifier(s), and can directly identify the semantic property based on the audio data. For example, assume the spoken utterance received at block 452 is "show me chili recipes". In this example, the spoken utterance (or text corresponding thereto) can be processed, using semantic classifier(s), to identify a semantic property of "chili", "food", "kitchen", and/or "cooking". Notably, the semantic property identified at block 454 may include one or more terms or phrases included in the spoken utterance, or may include a given semantic category into which the spoken utterance is classified.

At block 456, the system determines whether the spoken utterance specifies a given assistant device to utilize in satisfying the query or command included in the spoken utterance. If, at an iteration of block 456, the system determines the spoken utterance specifies a given assistant device to be utilized in satisfying the query or command, then the system may proceed to block 466. Block 466 is described below. For example, assume the spoken utterance received at block 452 is "show me chili recipes at the kitchen display device". In this example, the system can utilize the "kitchen display device" since the user specified that the "kitchen display device" should be utilized to present "chili recipes" to the user that provided the spoken utterance. As a result, the system can select the "kitchen display device" to satisfy the spoken utterance. If, at an iteration of block 456, the system determines the spoken utterance does not specify a given assistant device to be utilized in satisfying the query or command, then the system may proceed to block 458. For example, assume the spoken utterance received at block 452 is simply "show me chili recipes" without specifying any assistant device to satisfy the spoken utterance. In this example, the system can determine that the spoken utterance does not specify a given assistant device to satisfy the spoken utterance. As a result, the system needs to determine which assistant device(s) in the ecosystem should be utilized to satisfy the spoken utterance.

At block 458, the system determines whether the semantic property identified at block 454 matches a given semantic label assigned to a given assistant device from among the plurality of assistant devices. The system can generate an embedding corresponding to one or more terms of the semantic property, and can compare the embedding of the semantic property to a plurality of embeddings corresponding to one or more respective terms of respective semantic labels that are assigned to one or more of the plurality of assistant devices in the ecosystem. Further, the system can determine whether the embedding of the semantic property matches any of the plurality of embeddings of the respective semantic labels that are assigned to one or more of the plurality of assistant devices in the ecosystem. For instance, the system can determine whether a distance metric between the embedding of the semantic property and each of the plurality of embeddings of the respective semantic labels that are assigned to one or more of the plurality of assistant devices in the ecosystem. Further, the system can determine whether the distance metric satisfies a distance threshold (e.g., to identify an exact match or a soft match).

If, at an iteration of block 458, the system determines the semantic property identified at block 454 matches the given semantic label assigned to the given assistant device, then the system may proceed to block 460. At block 460, the system causes a given client device, that is associated with the given semantic label in a device topology representation of the ecosystem, to satisfy the query or command included in the spoken utterance. The system may then return to block 452 to monitor for additional audio via the respective microphone(s) of the plurality of assistant devices in the ecosystem. More particularly, the system can cause the given assistant device to perform one or more actions to satisfy the utterance. For example assume the spoken utterance received at block 452 is "show me chili recipes" with an identified semantic property of "chili", "food", "kitchen", and/or "cooking". Further assume that a semantic label assigned to a given assistant device is "kitchen display device". In this example, the system can select the given assistant device that is assigned the semantic label "kitchen display device" even if the spoken utterance was not received at this assistant device. Further, the system can cause the given assistant device that is assigned the semantic label "kitchen display device" to visually render chili recipes in response to the spoken utterance being received by the respective microphone(s) of the respective assistant device(s).

In various implementations, multiple assistant devices in the ecosystem may be assigned semantic labels that match the semantic property identified based on the spoken utterance. Notably, and although not depicted in FIG. 4 for the sake of clarity, the system may determine whether the semantic property identified at block 454 matches a given semantic label assigned to a given assistant device from among the plurality of assistant devices in selecting the one or more assistant devices to satisfy the spoken utterance in addition to or in lieu of using proximity information (e.g., described above with respect to the query/command processing engine 170 of FIG. 1). Continuing with the above example, assume that there are multiple assistant devices that are assigned the semantic label "kitchen display device". In this example, the assistant device, of the multiple assistant devices that are assigned the semantic label "kitchen display device", that is most proximate to the user in the ecosystem may be utilized to satisfy the spoken utterance. Moreover, and also not depicted in FIG. 4 for the sake of clarity, the system may determine whether the semantic property identified at block 454 matches a given semantic label assigned to a given assistant device from among the plurality of assistant devices in selecting the one or more assistant devices to satisfy the spoken utterance in addition to or in lieu of using device capability information (e.g., described above with respect to the query/command processing engine 170 of FIG. 1). Continuing with the above example, assume that a first assistant device having a display device is assigned the semantic label "kitchen display device" and that a second assistant device that does not have a display device is assigned the semantic label "kitchen speaker device". In this example, the first assistant device that is assigned the semantic label "kitchen display device" can be selected over the second assistant device that is assigned the semantic label "kitchen speaker device" to satisfy the spoken utterance because the spoken utterance specified "show me" chili recipes and the first assistant device is capable of displaying chili recipes responsive to the spoken utterance, whereas the second assistant device is not capable of displaying the chili recipes.

If, at an iteration of block 458, the system determines the semantic property identified at block 454 does not match any semantic label assigned to any of the assistant devices in the ecosystem, then the system may proceed to block 462. At block 462, the system identifies a given assistant device proximate to the user. For example, the system may identify the given assistant device that is most proximate to the user in the ecosystem (e.g., as described with respect to the presence sensors 105 of FIG. 1).

At block 464, the system determines whether the given assistant device identified at block 462 is capable of satisfying the query or command. The capabilities of each of the assistant devices can be stored in the device topology representation of the ecosystem and in association with the respective assistant devices (e.g., as device attributes for the respective assistant devices). If, at an iteration of block 464, the system determines that the given assistant device identified at the block 462 is not capable of satisfying the query or command, then the system may return to block 462 to identify an additional given assistant device that is also proximate to the user. The system may proceed again to block 464 to determine whether the additional given assistant device identified at the subsequent iteration of block 462 is capable of satisfying the query or command. The system may repeat this process until an assistant device that is capable of satisfying the query or command is identified. For example, assume the assistant device identified at block 462 is a standalone speaker device that lacks a display, but a display is required to satisfy the spoken utterance. In this example, the system may determine that the assistant devices identified at block 462 is not capable of satisfying the spoken utterance at block 464, and may return to block 462 to identify an additional assistant device at block 462 that is proximate to the user. If, at an iteration of block 464, the system determines that the given assistant device identified at the block 462 is capable of satisfying the query or command, then the system may proceed to block 462. Continuing with the above example, further assume the given assistant device identified at the first iteration of block 462 is a standalone speaker device that includes a display or an additional assistant device identified at an additional iteration of block 462 is a standalone speaker device that has a display. In this example, the system may determine that the assistant devices identified at the subsequent iteration of block 462 is capable of satisfying the spoken utterance at block 464, and the system may proceed to block 466.

At block 466, the system causes the given assistant device to satisfy the query or command included in the spoken utterance. The system can satisfy the spoken utterance in a similar manner described above with respect to block 460. The system may then return to block 452 to monitor for additional audio via the respective microphone(s) of the plurality of assistant devices in the ecosystem.

Figure 5:
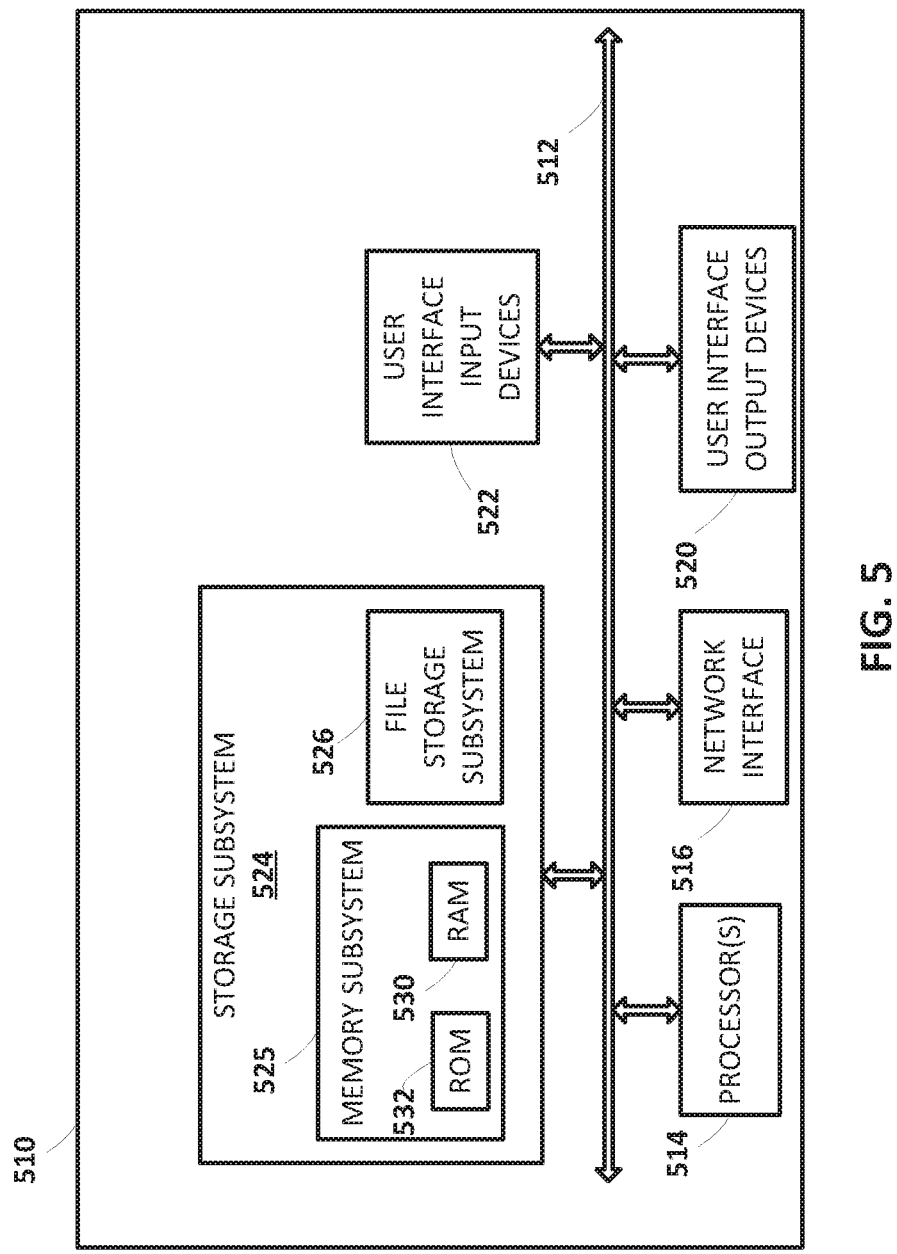
FIG. 5 depicts an example architecture of a computing device, in accordance with various implementations.

FIG. 5 is a block diagram of an example computing device 510 that may optionally be utilized to perform one or more aspects of techniques described herein. In some implementations, one or more of assistant input devices, one or more of cloud-based automated assistant components, one or more assistant non-input systems, one or more assistant non-input devices, and/or other component(s) may comprise one or more components of the example computing device 510.

Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the methods described herein, as well as to implement various components depicted in FIG. 1.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

In some implementations, a method implemented by one or more processors is provided, and includes identifying, from among a plurality of assistant devices in an ecosystem, a given assistant device; obtaining one or more device-specific signals that are associated with the given assistant device, the one or more device-specific signals being generated or received by the given assistant device; processing one or more of the device-specific signals to generate one or more candidate semantic labels for the given assistant device; selecting, from among the one or more candidate semantic labels, a given semantic label for the given assistant device; and assigning, in a device topology representation of the ecosystem, the given semantic label to the given assistant device. Assigning the given semantic label to the given assistant device includes automatically assigning the given semantic label to the given assistant device.

These and other implementations of the technology disclosed herein can include one or more of the following features.

In some implementations, one or more of the device-specific signals may include at least device activity associated with the given assistant device, and the device activity associated with the given assistant device may include a plurality of queries or commands previously received at the given assistant device. In some versions of those implementations, processing the one or more of the device-specific signals to generate one or more of the candidate semantic labels for the given assistant device may include processing, using a semantic classifier, the device activity associated with the given assistant device to classify each of the plurality of queries or commands into one or more of a plurality of disparate categories; and generating one or more of the candidate semantic labels based on the one or more of the plurality disparate categories in which each of the plurality of queries or commands are classified. In some further versions of those implementations, selecting the given semantic label for the given assistant device may include selecting the given semantic label for the given assistant device based on a quantity of the plurality of queries or commands classified into a given category, of the plurality disparate categories, the given semantic label being associated with the given semantic label.

In some implementations, one or more of the device-specific signals may include at least device activity associated with the given assistant device, wherein the device activity associated with the given assistant device comprises ambient noise previously detected at the given assistant device, and the ambient noise may have been previously detected at the given assistant device when speech reception was active. In some versions of those implementations, the method may further include processing, using an ambient noise detection model, the ambient noise previously detected at the given assistant device to classify the ambient noise into one or more of a plurality of disparate categories;

and generating one or more of the candidate semantic labels based on the one or more of the plurality disparate categories in which the ambient noise classified. In some further versions of those implementations, selecting the given semantic label for the given assistant device may include selecting the given semantic label for the given assistant device based on the ambient noise classified into a given category, of the plurality disparate categories, the given semantic label being associated with the given semantic label.

In some implementations one or more of the device-specific signals may include respective unique identifiers for one or more of the plurality of assistant devices that are locationally proximate to the given assistant device in the ecosystem. In some versions of those implementations, processing the one or more of the device-specific signals to generate one or more of the candidate semantic labels for the given assistant device may include identifying the one or more of the plurality of assistant devices that are locationally proximate to the given assistant device in the ecosystem based on one or more wireless signals; obtaining the respective unique identifiers for one or more of the plurality of assistant devices that are locationally proximate to the given assistant device; and generating one or more of the candidate semantic labels based on the respective unique identifiers for one or more of the plurality of assistant devices that are locationally proximate to the given assistant device. In some further versions of those implementations, selecting the given semantic label for the given assistant device may include selecting the given semantic label for the given assistant device based on a property of the respective unique identifiers for one or more of the plurality of assistant devices that are locationally proximate to the given assistant device.

In some implementations, the given assistant device may be identified in response to determining that the given assistant device is newly added to the ecosystem, or in response to determining that the given assistant device was moved locations within the ecosystem.

In some versions of those implementations, the given assistant device may be identified in response to determining that the given assistant device was moved locations within the ecosystem. In some further versions of those implementations, assigning the given semantic label to the given assistant device may include adding the given semantic label to a list of semantic labels associated with the given assistant device; or supplanting an existing semantic label associated with the given assistant device with the given semantic label. In some additional or alternative versions of those implementations, determining that the given assistant device was moved locations within the ecosystem may include identifying, based on one or more wireless signals, that a current subset of the plurality of assistant devices that are locationally proximate to the given assistant device in the ecosystem differ from a stored subset of the plurality of assistant devices that is stored in association with the given assistant device. In yet further versions of those implementations, the method may further include switching the given assistant device from an existing group of assistant devices that include one or more of the plurality of assistant devices to an additional existing group of assistant devices that include one or more of the plurality of assistant devices, or creating a new group of assistant devices that includes at least the given assistant device.

In some versions of those implementations, the given assistant device may be identified in response to determining that the given assistant device is newly added to the ecosystem. In some further versions of those implementations, assigning the given semantic label to the given assistant device may include adding the given semantic label to a list of semantic labels associated with the given assistant device. In some additional or alternative versions of those further implementations, determining that the given assistant device is newly added to the ecosystem may include identifying, based on one or more wireless signals, that the given assistant device has been added to a wireless network associated with the ecosystem. In yet further versions of those implementations, the method may further include adding the given assistant device to an existing group of assistant devices that includes one or more of the plurality of assistant devices, or creating a new group of assistant devices that includes at least the given assistant device.

In some implementations, the given assistant device may be identified on a periodic basis to verify whether the existing semantic label assigned to the given assistant device is correct.

In some implementations, the method may further include subsequent to assigning the given semantic label to the given assistant device in the device topology representation of the ecosystem: receiving, via one or more respective microphones of one of the plurality of assistant devices in the ecosystem, and from a user associated with the ecosystem, audio data corresponding to a spoken utterance, the spoken utterance including a query or command; processing the audio data corresponding to the spoken utterance to determine a semantic property of the query or command; determining that the semantic property of the query or command matches the given semantic label assigned to the given assistant device; and in response to determining that the semantic property of the query or command matches the given semantic label assigned to the given assistant device, causing the given assistant device to satisfy the query or command.

In some implementations, one or more of the device-specific signals may include at least user preferences of a user associated with the ecosystem, and the user preferences may be determined based on user interactions with the plurality of assistant devices in the ecosystem. In some versions of those implementations, processing the one or more of the device-specific signals to generate one or more of the candidate semantic labels for the given assistant device may include processing, using a semantic classifier, the user preferences to identify at least one semantic category, of a plurality of disparate semantic categories, that is associated with the user preferences; and generating one or more of the candidate semantic labels based on the given semantic category. In yet further versions of those implementations, selecting the given semantic label for the given assistant device may include determining that the given semantic label, from among the plurality of candidate semantic labels, is related to the given assistant device; and selecting the given semantic label for the given assistant device in response to determining that the given semantic label is related to the given assistant device. Determining that the given semantic label may be related to the given assistant device is based on one or more additional device-specific signals associated with the given assistant device. In some additional or alternative versions of those yet further implementations processing the user preferences to identify the at least one semantic category may be in response to receiving user input to assign one or more semantic labels to at least the given assistant device.

In some implementations, a method implemented by one or more processors is provided, and includes identifying, from among a plurality of assistant devices in an ecosystem, a given assistant device; obtaining one or more device-specific signals that are associated with the assistant device, the one or more device-specific signals being generated or received by the given assistant device; processing one or more of the device-specific signals to generate one or more candidate semantic labels for the given assistant device; generating, based on one or more of the candidate semantic labels, a prompt to solicit a selection of a given semantic label from a user of a client device, the selection being from among one or more of the candidate semantic labels; causing the prompt to be rendered at the client device of the user; and in response to receiving the selection of the given semantic label responsive to the prompt, assigning, in a device topology representation of the ecosystem, the given semantic label to the given assistant device.

These and other implementations of the technology disclosed herein can include one or more of the following features.

In some implementations, the one or more device-specific signals may include two or more of: device activity associated with the given assistant device, the device activity being associated with the given assistant device comprises a plurality of queries or commands previously received at the given assistant device; ambient noise previously detected at the given assistant device, the ambient noise being previously detected at the given assistant device when speech reception was active; or respective unique identifiers for one or more of the plurality of assistant devices that are locationally proximate to the given assistant device in the ecosystem.

In some implementations, a method implemented by one or more processors is provided, and includes identifying, from among a plurality of assistant devices in an ecosystem, a given assistant device; obtaining one or more device-specific signals that are associated with the given assistant device, the one or more device-specific signals being generated or received by the given assistant device; determining, based on one or more of the device-specific signals, a given semantic label for the given assistant device; assigning, in a device topology representation of the ecosystem, the given semantic label to the given assistant device; and subsequent to assigning the given semantic label to the given assistant device in the device topology representation of the ecosystem: receiving, via one or more respective microphones of one of the plurality of assistant devices in the ecosystem, and from a user associated with the ecosystem, audio data corresponding to a spoken utterance, the spoken utterance including a query or command; processing the audio data corresponding to the spoken utterance to determine a semantic property of the query or command; determining that the semantic property of the query or command matches the given semantic label assigned to the given assistant device; and in response to determining that the semantic property of the query or command matches the given semantic label assigned to the given assistant device, causing the given assistant device to satisfy the query or command.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

What is claimed is:

1. A method implemented by one or more processors, the method comprising:
   identifying, from among a plurality of assistant devices in an ecosystem, a given assistant device;
   obtaining one or more device-specific signals that are associated with the given assistant device, the one or more device-specific signals being generated or received by the given assistant device, wherein one or more of the device-specific signals comprise at least device activity associated with the given assistant device, and wherein the device activity associated with the given assistant device comprises ambient noise previously detected at the given assistant device when speech reception was active;
   processing one or more of the device-specific signals to generate one or more candidate semantic labels for the given assistant device, wherein processing one or more of the device-specific signals to generate one or more of the candidate semantic labels for the given assistant device comprises:
     processing the ambient noise that was previously detected at the given assistant device when speech reception was active to generate one or more of the candidate semantic labels for the given assistant device;
   selecting, from among the one or more candidate semantic labels, a given semantic label for the given assistant device; and
   assigning, in a device topology representation of the ecosystem, the given semantic label to the given assistant device, wherein assigning the given semantic label to the given assistant device comprises automatically assigning the given semantic label to the given assistant device.

2. The method of claim 1, wherein processing the ambient noise that was previously detected at the given assistant device when speech reception was to generate one or more of the candidate semantic labels for the given assistant device comprises:
   processing, using an ambient noise detection model, the ambient noise previously detected at the given assistant device to classify the ambient noise into one or more of a plurality of disparate categories; and
   generating one or more of the candidate semantic labels based on the one or more of the plurality disparate categories in which the ambient noise classified.

3. The method of claim 2, wherein selecting the given semantic label for the given assistant device comprises:
   selecting the given semantic label for the given assistant device based on the ambient noise classified into a given category, of the plurality disparate categories, the given semantic label being associated with the given semantic label.

4. The method of claim 3, wherein one or more of the device-specific signals further comprise respective unique identifiers for one or more of the plurality of assistant devices that are locationally proximate to the given assistant device in the ecosystem.

5. The method of claim 4, wherein processing one or more of the device-specific signals to generate one or more of the candidate semantic labels for the given assistant device further comprises:
 identifying the one or more of the plurality of assistant devices that are locationally proximate to the given assistant device in the ecosystem based on one or more wireless signals;
 obtaining the respective unique identifiers for one or more of the plurality of assistant devices that are locationally proximate to the given assistant device; and
 generating one or more of the candidate semantic labels further based on the respective unique identifiers for one or more of the plurality of assistant devices that are locationally proximate to the given assistant device.

6. The method of claim 5, wherein selecting the given semantic label for the given assistant device further comprises:
 selecting the given semantic label for the given assistant device further based on a property of the respective unique identifiers for one or more of the plurality of assistant devices that are locationally proximate to the given assistant device.

7. The method of claim 3, wherein the device activity associated with the given assistant device further comprises a plurality of queries or commands previously received at the given assistant device.

8. The method of claim 7, wherein processing one or more of the device-specific signals to generate one or more of the candidate semantic labels for the given assistant device further comprises:
 processing, using a semantic classifier, the device activity associated with the given assistant device to classify each of the plurality of queries or commands into one or more of a plurality of disparate categories; and
 generating one or more of the candidate semantic labels further based on the one or more of the plurality disparate categories in which each of the plurality of queries or commands are classified.

9. The method of claim 8, wherein selecting the given semantic label for the given assistant device further comprises:
 selecting the given semantic label for the given assistant device further based on a quantity of the plurality of queries or commands classified into a given category, of the plurality disparate categories, the given semantic label being associated with the given semantic label.

10. The method of claim 1, wherein the given assistant device is identified in response to determining that the given assistant device is newly added to the ecosystem, or in response to determining that the given assistant device was moved locations within the ecosystem.

11. The method of claim 10, wherein the given assistant device is identified in response to determining that the given assistant device was moved locations within the ecosystem.

12. The method of claim 11, wherein assigning the given semantic label to the given assistant device comprises:
 adding the given semantic label to a list of semantic labels associated with the given assistant device; or
 supplanting an existing semantic label associated with the given assistant device with the given semantic label.

13. The method of claim 11, wherein determining that the given assistant device was moved locations within the ecosystem comprises:
 identifying, based on one or more wireless signals, that a current subset of the plurality of assistant devices that are locationally proximate to the given assistant device in the ecosystem differ from a stored subset of the plurality of assistant devices that is stored in association with the given assistant device.

14. The method of claim 13, further comprising:
 switching the given assistant device from an existing group of assistant devices that include one or more of the plurality of assistant devices to an additional existing group of assistant devices that include one or more of the plurality of assistant devices, or
 creating a new group of assistant devices that includes at least the given assistant device.

15. The method of claim 10, wherein the given assistant device is identified in response to determining that the given assistant device is newly added to the ecosystem.

16. The method of claim 15, wherein assigning the given semantic label to the given assistant device comprises:
 adding the given semantic label to a list of semantic labels associated with the given assistant device.

17. The method of claim 15, wherein determining that the given assistant device is newly added to the ecosystem comprises:
 identifying, based on one or more wireless signals, that the given assistant device has been added to a wireless network associated with the ecosystem.

18. A method implemented by one or more processors, the method comprising:
 identifying, from among a plurality of assistant devices in an ecosystem, a given assistant device;
 obtaining one or more device-specific signals that are associated with the assistant device, the one or more device-specific signals being generated or received by the given assistant device, wherein one or more of the device-specific signals comprise at least device activity associated with the given assistant device, and wherein the device activity associated with the given assistant device comprises ambient noise previously detected at the given assistant device when speech reception was active;
 processing one or more of the device-specific signals to generate one or more candidate semantic labels for the given assistant device, wherein processing one or more of the device-specific signals to generate one or more of the candidate semantic labels for the given assistant device comprises:
  processing the ambient noise that previously detected at the given assistant device when speech reception was active to generate one or more of the candidate semantic labels for the given assistant device;
 generating, based on one or more of the candidate semantic labels, a prompt to solicit a selection of a given semantic label from a user of a client device, the selection being from among one or more of the candidate semantic labels;
 causing the prompt to be rendered at the client device of the user; and
 in response to receiving the selection of the given semantic label responsive to the prompt, assigning, in a device topology representation of the ecosystem, the given semantic label to the given assistant device.

19. The method of claim 18,
wherein processing the ambient noise that was previously detected at the given assistant device when speech reception was to generate one or more of the candidate semantic labels for the given assistant device comprises:
  processing, using an ambient noise detection model, the ambient noise previously detected at the given assistant device to classify the ambient noise into one or more of a plurality of disparate categories; and
  generating one or more of the candidate semantic labels based on the one or more of the plurality disparate categories in which the ambient noise classified; and
wherein selecting the given semantic label for the given assistant device comprises:
  selecting the given semantic label for the given assistant device based on the ambient noise classified into a given category, of the plurality disparate categories, the given semantic label being associated with the given semantic label.

20. A method implemented by one or more processors, the method comprising:
  identifying, from among a plurality of assistant devices in an ecosystem, a given assistant device;
  obtaining one or more device-specific signals that are associated with the given assistant device, the one or more device-specific signals being generated or received by the given assistant device, wherein one or more of the device-specific signals comprise at least device activity associated with the given assistant device, and wherein the device activity associated with the given assistant device comprises ambient noise previously detected at the given assistant device when speech reception was active;
  determining, based on one or more of the device-specific signals, a given semantic label for the given assistant device, wherein determining the given semantic label for the given assistant device is based on at least the ambient noise that was previously detected at the given assistant device when speech reception was active;
  assigning, in a device topology representation of the ecosystem, the given semantic label to the given assistant device; and
  subsequent to assigning the given semantic label to the given assistant device in the device topology representation of the ecosystem:
    receiving, via one or more respective microphones of one of the plurality of assistant devices in the ecosystem, and from a user associated with the ecosystem, audio data corresponding to a spoken utterance, the spoken utterance including a query or command;
    processing the audio data corresponding to the spoken utterance to determine a semantic property of the query or command;
    determining that the semantic property of the query or command matches the given semantic label assigned to the given assistant device; and
    in response to determining that the semantic property of the query or command matches the given semantic label assigned to the given assistant device, causing the given assistant device to satisfy the query or command.

* * * * *